(12) United States Patent
Nanjyo et al.

(10) Patent No.: US 11,106,031 B2
(45) Date of Patent: Aug. 31, 2021

(54) LIGHT DEFLECTOR, OPTICAL SCANNING DEVICE, IMAGE PROJECTION DEVICE, AND MOBILE OBJECT

(71) Applicant: Ricoh Company, Ltd., Tokyo (JP)

(72) Inventors: Takeshi Nanjyo, Hyogo (JP); Goichi Akanuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 356 days.

(21) Appl. No.: 16/311,741

(22) PCT Filed: Aug. 1, 2017

(86) PCT No.: PCT/JP2017/027801
§ 371 (c)(1),
(2) Date: Dec. 20, 2018

(87) PCT Pub. No.: WO2018/025833
PCT Pub. Date: Feb. 8, 2018

(65) Prior Publication Data
US 2020/0183151 A1 Jun. 11, 2020

(30) Foreign Application Priority Data
Aug. 2, 2016 (JP) .............................. JP2016-152268

(51) Int. Cl.
*G02B 26/10* (2006.01)
*G02B 26/08* (2006.01)

(52) U.S. Cl.
CPC ........ *G02B 26/105* (2013.01); *G02B 26/0858* (2013.01)

(58) Field of Classification Search
CPC ............................ G02B 26/101; G02B 26/105
(Continued)

(56) References Cited

U.S. PATENT DOCUMENTS 6,887,396 B2 * 5/2005 Tsuboi .................. B81B 3/0078
216/58
7,793,404 B2 * 9/2010 Murakami ......... G02B 26/0858
29/594
(Continued)

FOREIGN PATENT DOCUMENTS

EP 2 511 749 A2 10/2012
JP 2010-85506 A 4/2010
(Continued)

OTHER PUBLICATIONS

Office Action dated Sep. 27, 2019 in European Patent Application No. 17 826 586.4, 5 pages.
(Continued)

Primary Examiner — Nicholas R. Pasko
(74) Attorney, Agent, or Firm — Xsensus LLP

(57) ABSTRACT

A light deflector is provided including a mirror unit including a reflection plane, the mirror unit configured to rotate around a predetermined rotational axis, a pair of supporting beams configured to support the mirror unit in a rotatable manner, and drivers configured to drive the mirror unit to rotate, through the supporting beams. Each of the drivers has one end coupled to the supporting beams and another end coupled to a supporting unit formed to surround the mirror unit, and the supporting unit at least partially includes a thick portion and a thin portion different from each other in thickness.

11 Claims, 47 Drawing Sheets

(58) Field of Classification Search
USPC .......................................... 359/197.1–200.8
See application file for complete search history.

(56) References Cited

U.S. PATENT DOCUMENTS

| | | | | |
|---|---|---|---|---|
| 8,142,670 | B2 * | 3/2012 | Kouma | G02B 26/0841 |
| | | | | 216/11 |
| 8,300,290 | B2 * | 10/2012 | Maekawa | G02B 26/0858 |
| | | | | 359/200.8 |
| 8,432,592 | B2 * | 4/2013 | Mizuno | G02B 26/0841 |
| | | | | 359/199.2 |
| 2007/0063619 | A1 | 3/2007 | Dewa et al. | |
| 2007/0180672 | A1 | 8/2007 | Murakami et al. | |
| 2009/0284818 | A1 | 11/2009 | Maekawa | |
| 2010/0195180 | A1 | 8/2010 | Akanuma et al. | |
| 2015/0277107 | A1 * | 10/2015 | Aimono | G02B 26/0858 |
| | | | | 359/198.1 |
| 2016/0109697 | A1 | 4/2016 | Nakagawa et al. | |
| 2016/0139404 | A1 | 5/2016 | Akanuma | |

FOREIGN PATENT DOCUMENTS

| | | |
|---|---|---|
| JP | 2010-197994 | 9/2010 |
| JP | 2012-185314 | 9/2012 |
| JP | 5493735 B2 | 5/2014 |
| JP | 5670227 B2 | 2/2015 |
| WO | WO 2010/035469 A1 | 4/2010 |
| WO | WO 2010/035759 A1 | 4/2010 |

OTHER PUBLICATIONS

Japanese Office Action dated Aug. 18, 2020 in Japanese Patent Application No. 2016-152268, 3 pages.
International Search Report and Written Opinion dated Apr. 25, 2018 in PCT/JP2017/027801 filed Aug. 1, 2017.

* cited by examiner

LIGHT DEFLECTOR, OPTICAL SCANNING DEVICE, IMAGE PROJECTION DEVICE, AND MOBILE OBJECT

TECHNICAL FIELD

The present invention relates to a light deflector, an optical scanning device, an image projection device, and a mobile object.

BACKGROUND ART

The following configuration has been known as a light deflector using a micro-machining technique. A piezoelectric member is interposed between an upper electrode and a lower electrode. A voltage is applied across the upper and lower electrodes to oscillate a mirror unit to reflect light, and then the light is output as scanning light (e.g., see PTL 1).

Such a light deflector is required to increase the oscillation angle of a mirror unit in order to increase a scanning angle (e.g., see PTL 2).

However, the oscillation angle is determined by the amount of deformation of the piezoelectric member, and thus there is a disadvantage that the oscillation angle is difficult to increase easily.

CITATION LIST

Patent Literature

PTL 1: Japanese Patent No. 5493735
PTL 2: Japanese Patent No. 5670227

SUMMARY OF INVENTION

Technical Problem

The present invention has been made in consideration of the technical problems as above, and an object of the present invention is to increase the scanning angle of a light deflector.

Solution to Problem

In order to solve the problems as above, a light deflector is provided including a mirror unit including a reflection plane, the mirror unit configured to rotate around a predetermined rotational axis, a pair of supporting beams configured to support the mirror unit in a rotatable manner, and at least one driver configured to drive the mirror unit to rotate, through the supporting beams. The at least one driver has one end coupled to the supporting beams and another end coupled to a supporting unit formed to surround the mirror unit, and the supporting unit at least partially includes a thick portion and a thin portion different from each other in thickness.

Advantageous Effects of Invention

According to the present invention, decreasing the rigidity of at least some of the light deflector, can provide the light deflector that increases the scanning angle.

DESCRIPTION OF EMBODIMENTS

An embodiment of the present invention will be described in detail below.

<Optical Scanning System>

First, an optical scanning system to which a driving device according to the embodiment of the present invention has been applied, will be described in detail referring to FIGS. 1 to 4.

Figure 1:
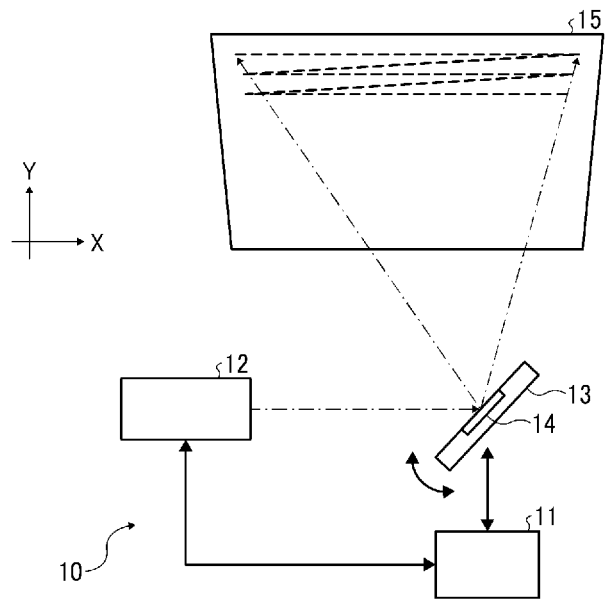
FIG. 1 is an exemplary schematic diagram of an optical scanning system.

FIG. 1 illustrates an exemplary schematic diagram of the optical scanning system.

As illustrated in FIG. 1, the optical scanning system 10 deflects light emitted from a light source 12 in accordance with the control of a driving device 11, with a reflection plane 14 included in a light deflector 13, so as to optically scan a to-be-scanned surface 15.

The optical scanning system 10 includes the driving device 11, the light source 12, and the light deflector 13 including the reflection plane 14.

The driving device 11 includes, for example, an electronic circuit unit including a central processing unit (CPU) and a field-programmable gate array (FPGA). The light deflector 13 includes, for example, a micro electromechanical systems (MEMS) device including the reflection plane 14 and capable of moving the reflection plane 14. The light source 12 includes, for example, a laser device that emits a laser. Note that, the to-be-scanned surface 15 includes, for example, a screen.

The driving device 11 generates a control command for each of the light source 12 and the light deflector 13 on the basis of optical scanning information that has been acquired, so as to output a driving signal to each of the light source 12 and the light deflector 13 on the basis of the control command.

The light source 12 performs emission of a light source on the basis of the driving signal that has been input. The light deflector 13 moves the reflection plane 14 to at least one of a uniaxial direction and a biaxial direction, on the basis of the driving signal that has been input.

With this arrangement, for example, the control of the driving device 11 based on image information being exemplary optical scanning information, reciprocates the reflection plane 14 of the light deflector 13 in a predetermined range in the biaxial direction. Then, the light incident on the reflection plane 14, the light being emitted from the light source 12, is deflected to perform the optical scanning so that an arbitrary image can be projected onto the to-be-scanned surface 15.

Note that, the details of the light deflector and the details of the control of the driving device according to the present embodiment, will be described later.

Figure 2:
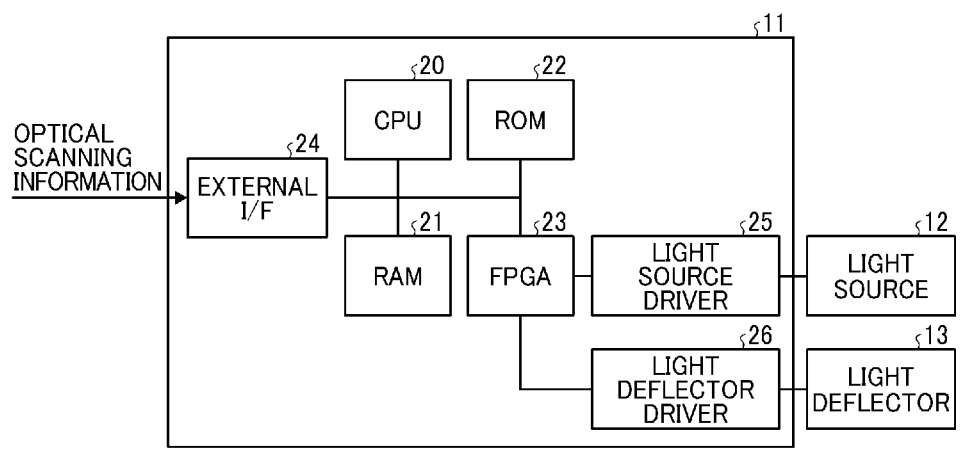
FIG. 2 is a diagram of an exemplary hardware configuration of the optical scanning system.

Next, an exemplary hardware configuration of the optical scanning system 10 will be described referring to FIG. 2. FIG. 2 is a diagram of the exemplary hardware configuration of the optical scanning system 10. As illustrated in FIG. 2, the optical scanning system 10 includes the driving device 11, the light source 12, and the light deflector 13, electrically coupled to each other.

<Driving Device>

The driving device 11 includes a CPU 20, a random access memory (RAM) 21, a read only memory (ROM) 22, an FPGA 23, an external interface (I/F) 24, a light source driver 25, and a light deflector driver 26.

The CPU 20 includes an arithmetic device that reads a program and data from a storage device, such as the ROM 22, onto the RAM 21 and performs processing to achieve the control and function of the entire driving device 11.

The RAM 21 includes a volatile storage device that temporarily retains a program and data.

The ROM 22 includes a nonvolatile storage device capable of retaining a program and data even when power is turned off, and stores a processing program and data executed by the CPU 20 to control each function of the optical scanning system 10.

The FPGA 23 includes a circuit that outputs a control signal suitable for each of the light source driver 25 and the optical deflector driver 26 in accordance with the processing of the CPU 20.

The external I/F 24 includes an interface with, for example, an external device or a network. Examples of the external device include a host device, such as a personal computer (PC), storage devices, such as a universal serial bus (USB) memory, a secure digital (SD) card, a compact disc (CD), a digital versatile disc (DVD), a hard disk drive (HDD), and a solid-state drive (SSD). Examples of the network include a controller area network (CAN) for a motor vehicle, a local area network (LAN), and the Internet. The external I/F 24 at least has a configuration capable of allowing connection or communication with the external device, and the external interface 24 may be prepared for each external device.

The light source driver includes an electric circuit that outputs a driving signal, such as a driving voltage, to the light source 12 in accordance with the control signal that has been input.

The light deflector driver 26 includes an electric circuit that outputs a driving signal, such as a driving voltage, to the light deflector 13 in accordance with the control signal that has been input.

In the driving device 11, the CPU 20 acquires optical scanning information from the external device or the network through the external interface 24. Note that, a configuration in which the CPU 20 can acquire the optical scanning information, is at least provided. The ROM 22 or the FPGA 23 in the driving device 11 may be configured to store the optical scanning information. Alternatively, an additional storage device, such as an SSD, may be provided in the driving device 11 so that the storage device may be configured to store the optical scanning information.

Here, the optical scanning information includes information indicating how the optical scanning is performed to the to-be-scanned surface 15. For example, in a case where the optical scanning displays an image, the optical scanning information includes image data. For example, in a case where the optical scanning performs optical writing, the optical scanning information includes writing data indicating a writing order or a writing place. Besides, for example, in a case where the optical scanning performs object recognition, the optical scanning information includes emission data indicating timing with which light for the object recognition is emitted and an emission range. The driving device 11 according to the present embodiment, can achieve a functional configuration to be described next, with the command of the CPU 20 and the hardware configuration illustrated in FIG. 2.

<Functional Configuration of Driving Device>

Figure 3:
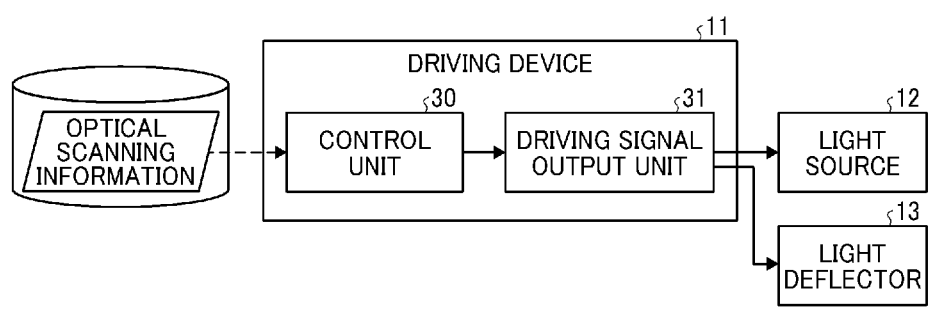
FIG. 3 is an exemplary functional block diagram of a driving device.

Next, the functional configuration of the driving device 11 in the optical scanning system 10 will be described referring to FIG. 3. FIG. 3 is an exemplary functional block diagram of the driving device 11 of the optical scanning system 10.

As illustrated in FIG. 3, the driving device 11 has the functions of a control unit 30 and a driving signal output unit 31. The control unit 30 is achieved with, for example, the CPU 20 and the FPGA 23. The control unit 30 acquires the optical scanning information from the external device and converts the optical scanning information into a control signal to output the control signal to the driving signal output unit 31. For example, the control unit 30 is included in a control means. The control unit 30 acquires image data as the optical scanning information from the external device and generates a control signal from the image data with predetermined processing to output the control signal to the driving signal output unit 31.

The driving signal output unit 31 is achieved with the light source driver 25 and the light deflector driver 26, and is included in an application means. The driving signal output unit 31 outputs a driving signal to the light source 12 or the light deflector 13 on the basis of the control signal that has been input. For example, the driving signal output unit 31 (the application means) may be provided for each object to which outputting the driving signal.

The driving signal includes a signal for controlling the driving of the light source 12 or the light deflector 13. For example, in the light source 12, the signal includes a driving voltage for controlling the emission timing and the emission intensity of the light source. For example, in the light deflector 13, the signal includes a driving voltage for controlling the timing of moving the reflection plane 14 included in the light deflector 13 and the movable range. Note that, the driving device 11 may acquire the emission timing of the light source and light-receiving timing from the light source 12 and an external device, such as a light-receiving device, respectively, so as to synchronize the pieces of timing with the driving of the light deflector 13.

<Optical Scanning Processing>

Figure 4:
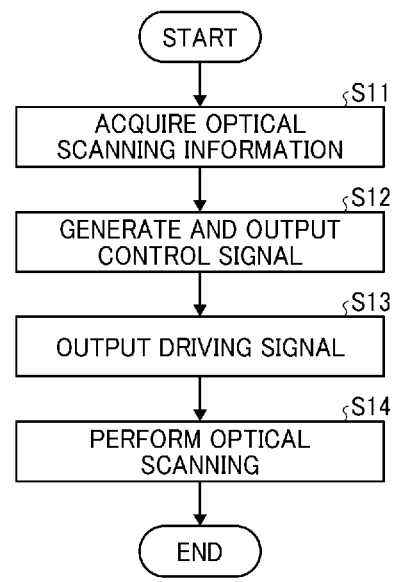
FIG. 4 is an exemplary flowchart of processing according to the optical scanning system.

Next, processing of the optical scanning to the to-be-scanned surface 15 by the optical scanning system 10 will be described referring to FIG. 4. FIG. 4 is an exemplary flowchart of the processing according to the optical scanning system 10.

At step S11, the control unit 30 acquires optical scanning information from, for example, an external device. At step S12, the control unit 30 generates a control signal from the acquired optical scanning information, and outputs the generated control signal to the driving signal output unit 31.

At step S13, the driving signal output unit 31 outputs a driving signal to each of the light source 12 and the light deflector 13, based on the input control signal.

At step S14, the light source 12 emits light based on the input driving signal. The light deflector 13 moves the reflection plane 14 on the basis of the driving signal that has been input. The driving of the light source 12 and the driving of the light deflector 13, deflect the light in an arbitrary direction so that the optical scanning is performed.

Note that, the optical scanning system 10 includes one number of the driving device 11 including a device that controls the light source 12 and the light deflector 13, with the function, but a driving device for the light source 12 and a driving device for the light deflector 13 may be separately provided.

The optical scanning system 10 includes one number of the driving device 11 including the function of the control unit 30 and the function of the driving signal output unit 31 provided for the light source 12 and the light deflector 13. However, the functions may be individually present, and thus, for example, a driving signal output device including the driving signal output unit 31 may be separately provided from the driving device 11 including the control unit 30. Note that, the light deflector 13 including the reflection plane 14 and the driving device 11 in the optical scanning system 10, may be included in an optical deflection system that performs optical deflection.

<Image Projection Device>

Next, an image projection device to which the driving device according to the present embodiment has been applied, will be described in detail referring to FIGS. 5 and 6.

Figure 5:
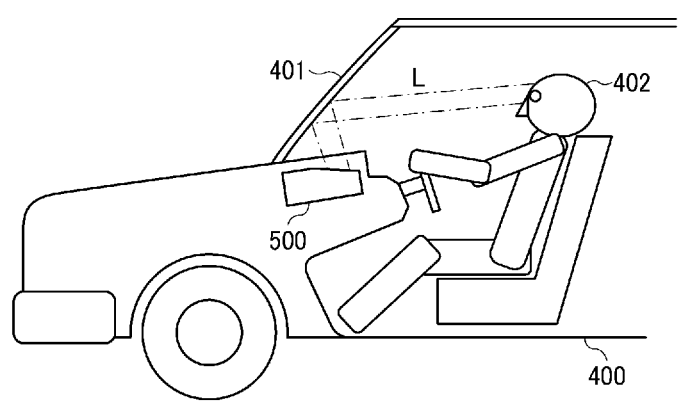
FIG. 5 is an exemplary schematic diagram of a motor vehicle equipped with a head-up display device.

FIG. 5 is a schematic diagram of a motor vehicle 400 including a mobile object equipped with an exemplary head-up display device 500 of the image projection device, according to the embodiment. FIG. 6 is an exemplary schematic diagram of the head-up display device 500.

The image projection device includes a device that projects an image with optical scanning, and includes, for example, a head-up display device.

As illustrated in FIG. 5, the head-up display device 500 is installed, for example, in the vicinity of a windshield (e.g., a windshield 401) of the motor vehicle 400. Projection light L emitted from the head-up display device 500 is reflected by the windshield 401 so as to travel to an observer (a driver 402) being a user.

With this arrangement, the driver 402 can visually recognize an image projected by the head-up display device 500 as a virtual image. Note that, a configuration in which a combiner is mounted on an inner wall surface of the windshield to allow the user to visually recognize a virtual image with projection light reflected by the combiner, may be provided.

Figure 6:
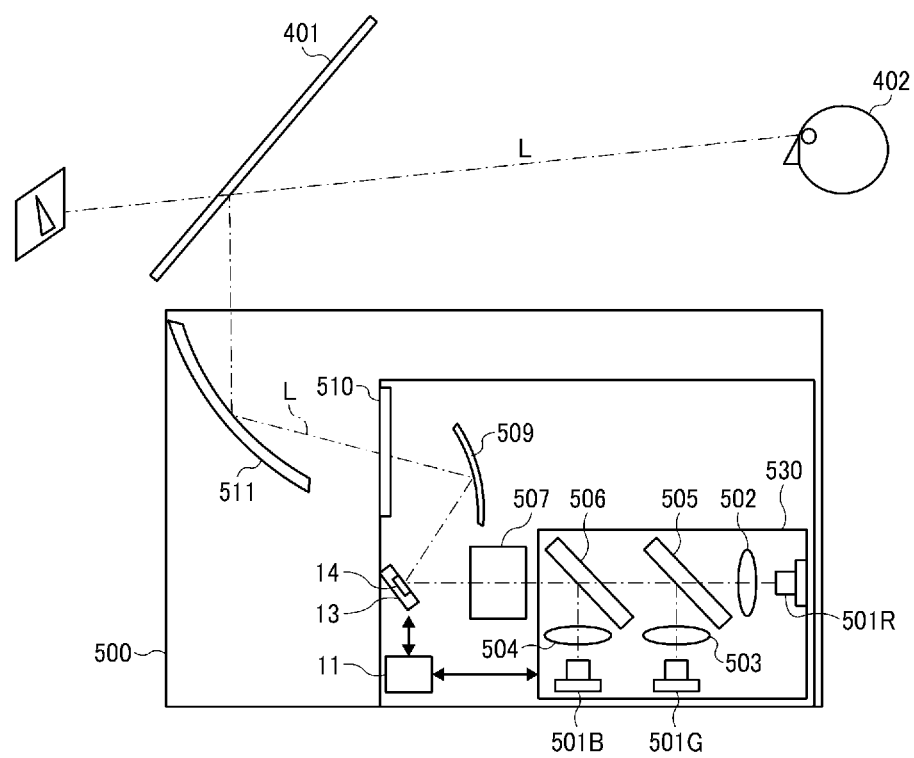
FIG. 6 is an exemplary schematic diagram of the head-up display device.

As illustrated in FIG. 6, pieces of laser light are emitted from red, green, and blue laser light sources 501R, 501G, and 501B in the head-up display device 500. The pieces of laser light that have been emitted travel through incidence optical system including collimator lenses 502, 503, and 504 provided for the respective laser light sources, two dichroic mirrors 505 and 506, and a light amount adjusting unit 507, and then the pieces of laser light are deflected by the light deflector 13 including the reflection plane 14.

Then, the pieces of laser light that have been deflected are projected on a screen through a projection optical system including a free-form surface mirror 509, an intermediate screen 510, and a projection mirror 511.

Note that, in the head-up display device 500, the laser light sources 501R, 501G, and 501B, the collimator lenses 502, 503, and 504, and the dichroic mirrors 505 and 506 are unitized in an optical housing as a light source unit 530.

The head-up display device 500 projects an intermediate image displayed on the intermediate screen 510, onto the windshield 401 of the motor vehicle 400, so that the driver 402 visually recognizes the intermediate image as a virtual image.

The collimator lenses 502, 503, and 504 convert the pieces of color laser light emitted from the laser light sources 501R, 501G, and 501B into pieces of substantially collimated light, respectively, and the two dichroic mirrors 505 and 506 synthesize the pieces of substantially collimated light. After the light amount adjusting unit 507 adjusts the light amount of the pieces of laser light that have been synthesized, the light deflector 13 including the reflection plane 14 performs two-dimensional scanning with the pieces of laser light. The projection light L with which the two-dimensional scanning has been performed by the light deflector 13 is reflected by the free-form surface mirror 509 so that the distortion of the projection light L is corrected. Then, the projection light L converges on the intermediate screen 510 to display the intermediate image. The intermediate screen 510 includes a microlens array including microlenses two-dimensionally arranged, and magnifies the projection light L incident on the intermediate screen 510, in units of microlenses.

The light deflector 13 reciprocates the reflection plane 14 in the biaxial direction so as to perform the two dimensional scanning with the projection light L incident on the reflection plane 14. The control of the driving of the light deflector 13 is performed in synchronization with the light emission timing of the laser light sources 501R, 501G, and 501B.

The exemplary head-up display device 500 of the image projection device has been described above, but the image projection device at least includes a device that performs optical scanning with the light deflector 13 including the reflection plane 14 to project an image.

The image projection device can be similarly applied to, for example, a projector that projects an image onto a display screen, the projector being on a desk, or a head-mounted display device that is mounted on a wearing member to be worn on the head of an observer to perform projection onto a reflective and transmissive screen included in the wearing member or to project an image onto an eyeball as a screen.

The image projection device may be mounted on, for example, a mobile object, such as an aircraft, a vessel, or a mobile robot, or non-mobile object, such as a working robot that operates an object to be driven, such as a manipulator, the working robot not moving from the place, in addition to a vehicle and a wearing member.

<Optical Writing Device>

Next, an optical writing device to which the driving device 11 according to the present embodiment has been applied, will be described in detail referring to FIGS. 7 and 8.

Figure 7:
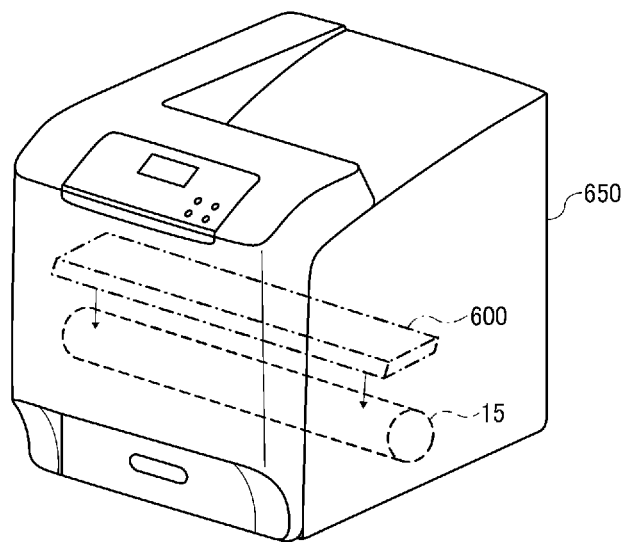
FIG. 7 is an exemplary schematic diagram of an image forming apparatus equipped with an optical writing device.

FIG. 7 illustrates an exemplary image forming apparatus including the optical writing device 600 incorporated. FIG. 8 is an exemplary schematic diagram of the optical writing device 600.

As illustrated in FIG. 7, the optical writing device 600 is used as a constituent member of the image forming apparatus typified by a laser printer 650 having a printer function with laser light. In the image forming apparatus, the optical writing device 600 performs optical scanning to a photoconductor drum being the to-be-scanned surface 15 with one or a plurality of laser beams, so as to perform optical writing onto the photoconductor drum.

Figure 8:
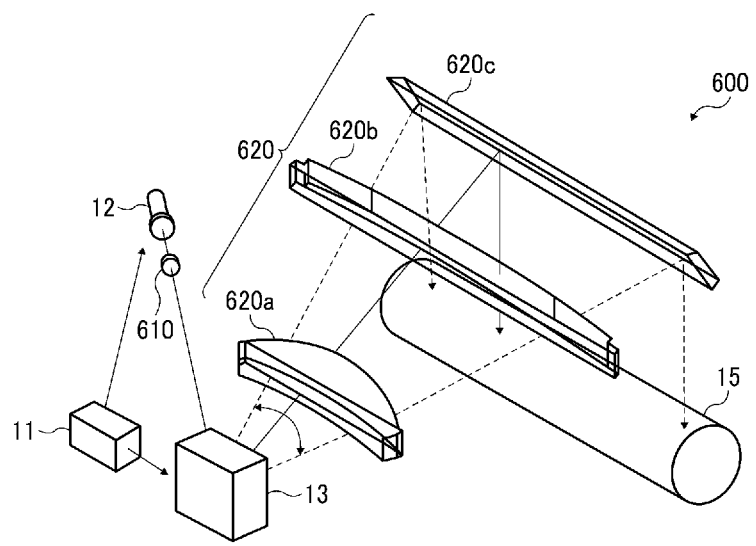
FIG. 8 is an exemplary schematic diagram of the optical writing device.

As illustrated in FIG. 8, in the optical writing device 600, the laser light from the light source 12, such as a laser element, travels through an imaging forming optical system 610, such as a collimator lens, and then the light deflector 13 including the reflection plane 14 deflects the laser light in the uniaxial direction or the biaxial direction. After that, the laser light that has been deflected by the light deflector 13 travels through a scanning optical system 620 including a first lens 620a, a second lens 620b, and a reflecting mirror 620c, and then the to-be-scanned surface 15 (e.g., the photoconductor drum or photosensitive paper) is irradiated with the laser light so that the optical writing is performed. The scanning optical system 620 forms the image of a light beam in a spot shape on the to-be-scanned surface 15.

The light source 12 and the light deflector 13 including the reflection plane 14 are driven on the basis of the control of the driving device 11.

In this manner, the optical writing device 600 can be used as the constituent member of the image forming apparatus having the printer function with the laser light. Changing the scanning optical system and allowing the optical scanning not only in the uniaxial direction but also in the biaxial direction, can use the optical writing device as a constituent member of an image forming apparatus, such as a laser labeling device that performs optical scanning and heating with laser light being deflected onto a thermal medium so as to make printing. The light deflector 13 including the reflection plane 14, to be applied to the optical writing device, is smaller than a rotary polygon mirror using a polygon mirror, in power consumption for driving, so that power saving of the optical writing device is advantageous to achieve.

Wind noise in oscillating the light deflector 13 is smaller than the wind noise of the rotary polygon mirror so that the optical writing device is advantageous to improve in quietness. The optical writing device requires less installation space than the rotary polygon mirror and the amount of heat generated by the light deflector 13 is also small, so that miniaturization is easy to perform. Thus, the image forming apparatus is advantageous to miniaturize.

<Object Recognition Device>

Next, an object recognition device to which the driving device according to the present embodiment has been applied, will be described in detail referring to FIGS. 9 and 10.

Figure 9:
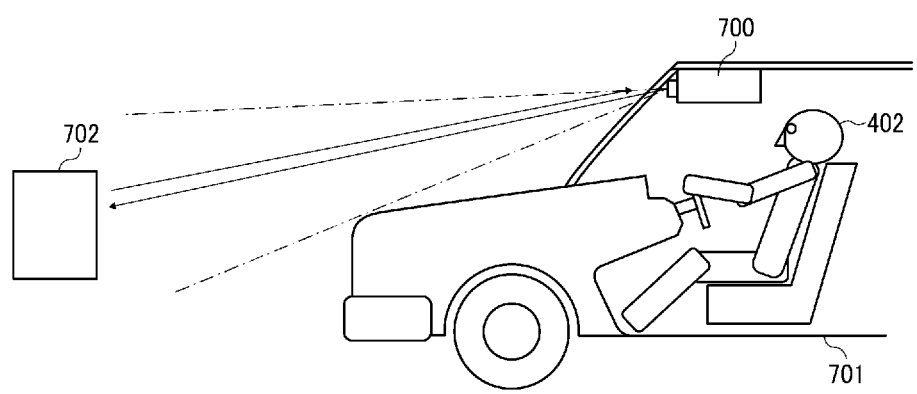
FIG. 9 is an exemplary schematic diagram of a motor vehicle installed with a light detection and ranging (LiDAR) device.

FIG. 9 is a schematic diagram of a motor vehicle equipped with an exemplary light detection and ranging (LiDAR) device of the object recognition device. FIG. 10 is an exemplary schematic diagram of the LiDAR device. The object recognition device recognizes an object in a target direction and, for example, includes the LiDAR device. As illustrated in FIG. 9, the LiDAR device 700 is mounted on, for example, the motor vehicle 701, and performs optical scanning in the target direction to receive reflected light from an object to be recognized 702 present in the target direction so that the object to be recognized 702 is recognized.

Figure 10:
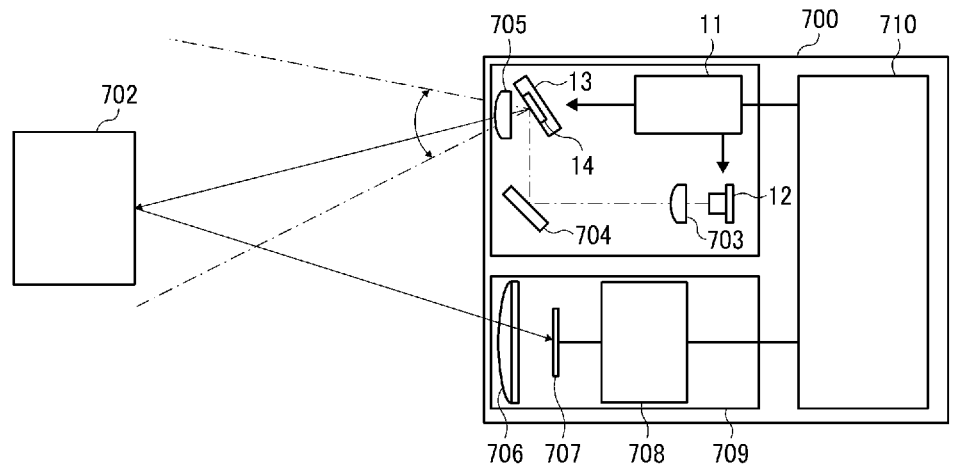
FIG. 10 is an exemplary schematic diagram of the LiDAR device.

As illustrated in FIG. 10, laser light emitted from the light source 12 travels through an incidence optical system including a collimator lens 703 being an optical system that converts divergent light into substantially collimated light, and a plane mirror 704, and then the light deflector 13 including the reflection plane 14 performs scanning with the laser light in the uniaxial direction or in the biaxial direction. Then, the laser light travels through a projection lens 705 being a projection optical system and then the object to be recognized 702 ahead of the device is irradiated with the laser light. The driving device 11 controls the driving of the light source 12 and the driving of the light deflector 13. The reflected light reflected by the object to be recognized 702 is photo-detected by a photodetector 709.

That is, the reflected light is received by an image pickup device 707 through a condenser lens 706 being a light receiving optical system, and then the image pickup device 707 outputs a detected signal to a signal processing circuit 708. The signal processing circuit 708 performs predetermined processing, such as binarization and noise processing, to the detected signal that has been input, so as to output a result to a range-finding circuit 710.

The range-finding circuit 710 recognizes whether the object to be recognized 702 is present, with the time difference between timing at which the light source 12 emits the laser light and timing at which the photodetector 709 receives the laser light or with a phase difference for each pixel in the image pickup device 707 that has received the laser light, and further calculates distance information on the object to be recognized 702.

The light deflector 13 including the reflection plane 14 is harder to break and smaller in size than a polygon mirror so that a compact LiDAR device having high durability can be provided.

Such a LiDAR device is attached to, for example, a vehicle, an aircraft, a vessel, or a robot, and can recognize whether an obstacle is present or a distance to the obstacle, while performing optical scanning in a predetermined range. The object recognition device has been described with the exemplary LiDAR device 700. However, the object recognition device at least includes a device that controls the light deflector 13 including the reflection plane 14 with the driving device 11 to perform optical scanning and then receives reflected light with a photodetector to recognize the object to be recognized 702. Thus, the object recognition device is not limited to the device according to the embodiment described above.

For example, the object recognition device can be similarly applied to a constituent member for biometric authentication that calculates object information on a shape from distance information acquired by performing optical scanning to a hand or a face and then recognizes the object referring to a record, a security sensor that recognizes an intruding object with optical scanning in a target range, or a three-dimensional scanner that calculates object information on a shape, from distance information acquired by optical scanning to perform recognition and then outputs the object information as three-dimensional data.

<Packaging>

Next, packaging of the light deflector controlled by the driving device according to the present embodiment, will be described referring to FIG. 11.

Figure 11:
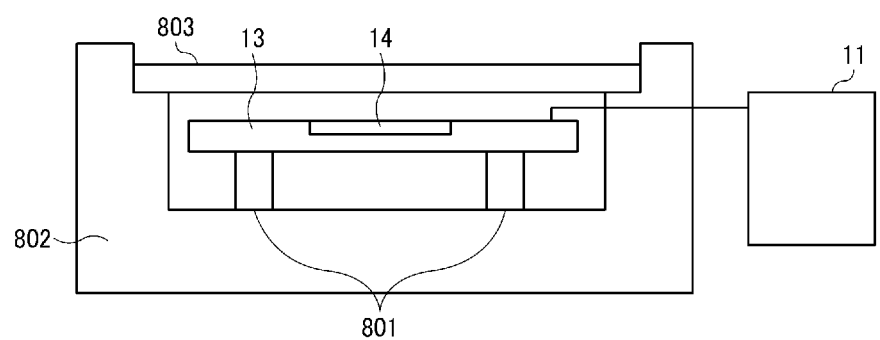
FIG. 11 is an exemplary schematic diagram of the light deflector that has been packaged.

FIG. 11 is an exemplary schematic diagram of the light deflector 13 that has been packaged.

As illustrated in FIG. 11, the light deflector 13 is attached to an attaching member 801 arranged inside a package member 802 being a housing. Then, a portion of the package member 802 is covered with a transmissive member 803 so as to be hermetically sealed so that the light deflector 13 is packaged.

Furthermore, an inert gas, such as nitrogen, is sealed in the package. With this arrangement, the light deflector 13 is inhibited from degrading due to oxidation, and durability against environmental changes, such as temperature, improves.

Next, the details of the light deflector and the details of the control of the driving device according to the present embodiment, used in the optical deflection system, the optical scanning system, the image projection device, the optical writing device, and the object recognition device, will be described.

<Details of Optical Deflector>

First, the light deflector will be described in detail referring to FIGS. 12 to 14.

Figure 12:
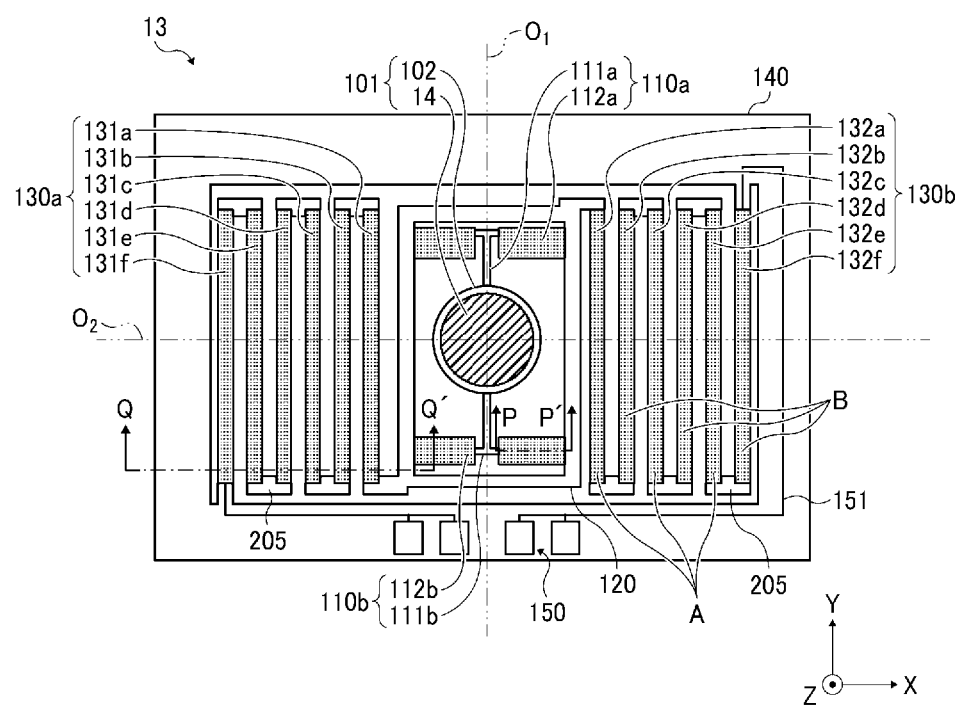
FIG. 12 is a plan view illustrating an exemplary configuration of the light deflector.

FIG. 12 is a plan view of the light deflector being dual-typed, the light deflector being capable of performing optical deflection in the biaxial direction including an X direction being a main-scanning direction and a Y direction being a sub-scanning direction. FIG. 13 is a cross-sectional view taken along line P-P' of FIG. 12. FIG. 14 is a cross-sectional view taken along line Q-Q' of FIG. 12. In the following description, a direction in which a bundle of the light L reflected by the reflection plane 14 moves when the reflection plane 14 is driven around a first axis $O_1$ as to be described later, is defined as the main-scanning direction X, and a direction in which the bundle of the light L moves when the reflection plane 14 is driven around a second axis $O_2$, is defined as the sub-scanning direction Y. Note that, the main-scanning direction and the sub-scanning direction are not limited to the configuration, and thus the main-scanning direction and the sub-scanning direction may be appropriately changed in accordance with a configuration.

The light deflector 13 includes a mirror unit 101 being the reflection plane that reflects the light L that has been incident, and first driving units 110a and 110b coupled to the mirror unit 101, the first driving units 110a and 110b configured to drive the mirror unit 101 around the first axis $O_1$ parallel to the Y axis.

The light deflector 13 also includes a first supporting unit 120 being a supporting member supporting the mirror unit 101 and the first driving units 110a and 110b.

The light deflector 13 also includes second driving units 130a and 130b coupled to the first supporting unit 120, the second driving units 130a and 130b configured to drive the mirror unit 101 and the first supporting unit 120 around the second axis $O_2$ parallel to the X axis, and a second supporting unit 140 being a frame body supporting the second driving units 130a and 130b.

Note that, the first driving units 110a and 110b, the mirror unit 101, and the first supporting unit 120 according to the present embodiment are included in a movable unit that turns around the second axis $O_2$. The second driving units 130a and 130b support the movable unit with respect to the second supporting unit 140.

That is, the first driving units 110a and 110b are coupled to the first supporting unit 120 being a supporting unit formed so as to surround the mirror unit 101.

The second driving units 130a and 130b are coupled to the second supporting unit 140 being a supporting unit formed so as to surround the mirror unit 101 and the first supporting unit 120.

The light deflector 13 includes an electrode connector 150 and a conduction path 151, the electrode connector 150 being electrically coupled to the first driving units 110a and 110b, the second driving units 130a and 130b, and the driving device, the conduction path 151 extending from the electrode connector 150 to the first driving units 110a and 110b.

Figure 13:
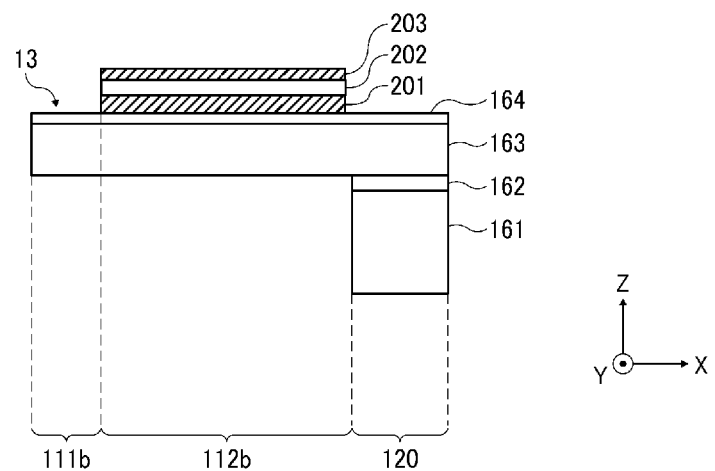
FIG. 13 is a cross-sectional view taken along line P-P' of the light deflector illustrated in FIG. 12.

As illustrated in FIG. 13, the light deflector 13 includes the reflection plane 14, first piezoelectric driving units 112a and 112b, second piezoelectric driving units 131a to 131f and 132a to 132f, and the electrode connector 150 integrally formed on a substrate including one silicon on insulator (SOI) substrate to which forming has been performed with etching processing.

Note that, the formation of each of the constituent elements may be performed after the forming of the SOI substrate or during the forming of the SOI substrate.

Figure 14:
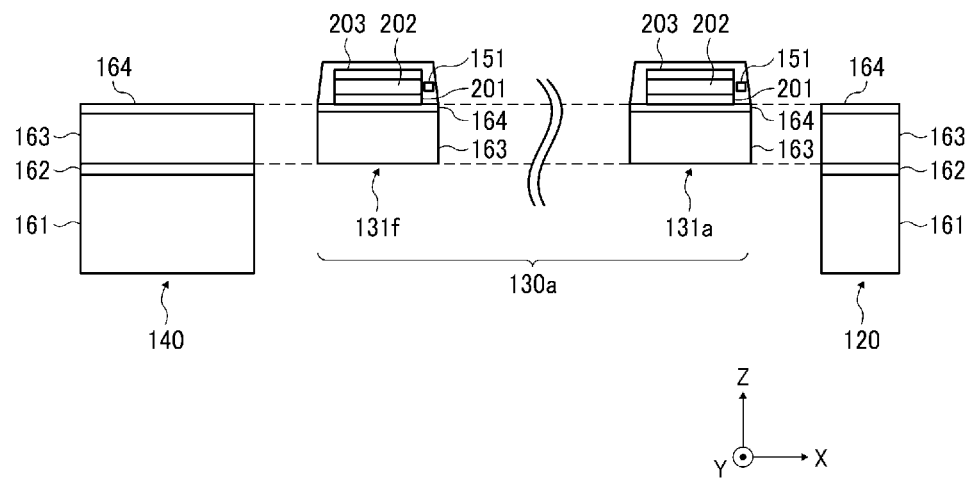
FIG. 14 is a cross-sectional view taken along line Q-Q' of the light deflector illustrated in FIG. 12.
Figure 15A:
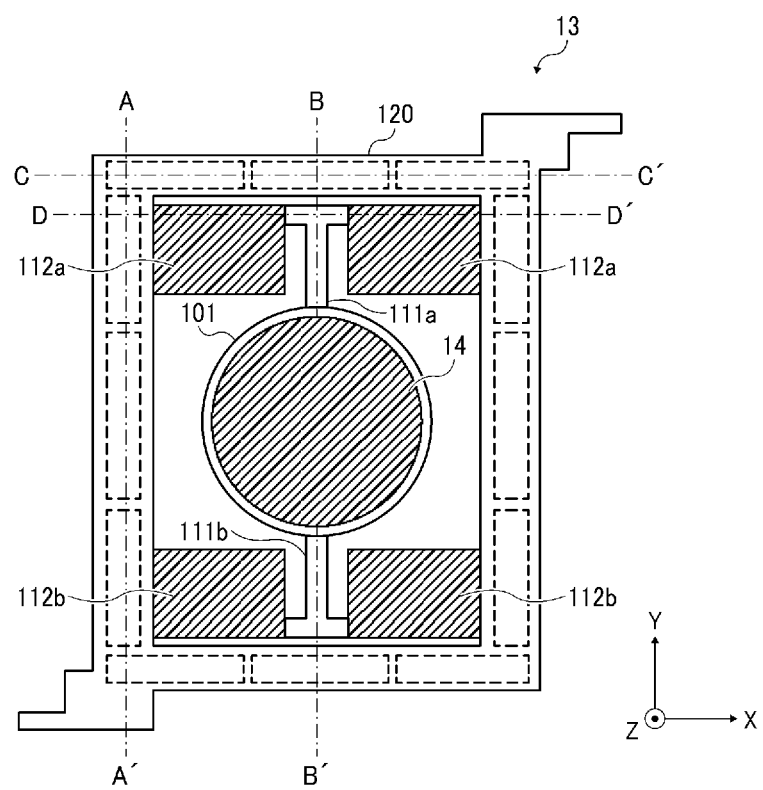
FIGS. 15A to 15E are views schematically illustrating a structure of a movable unit of the light deflector.
Figure 15B:
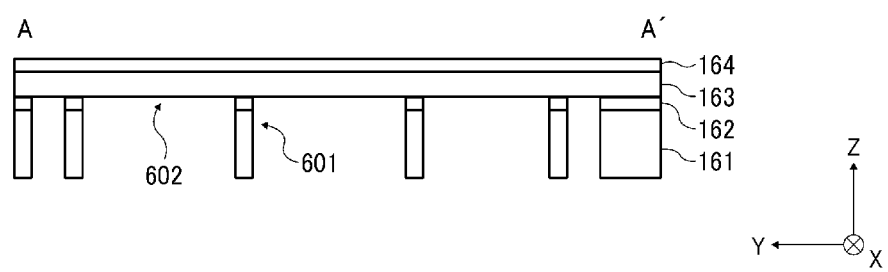
Figure 15C:
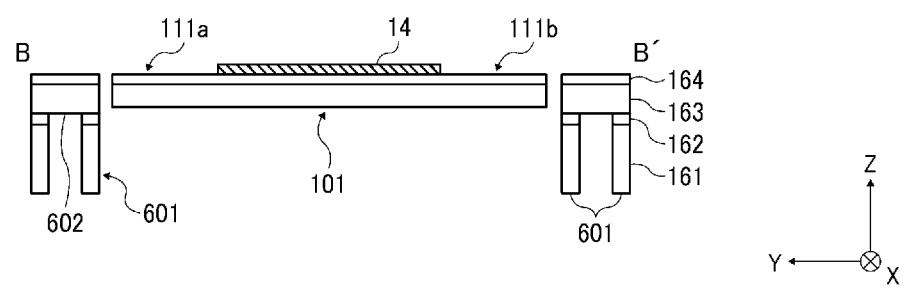
Figure 15D:
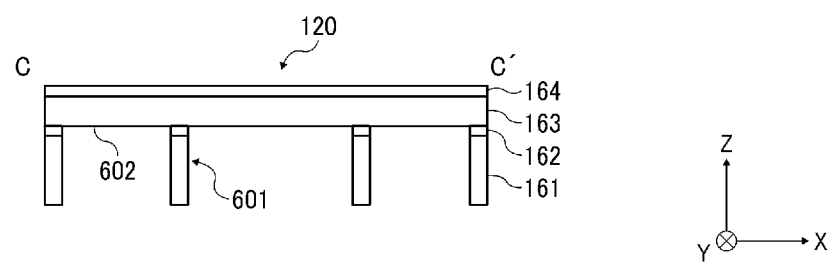
Figure 15E:
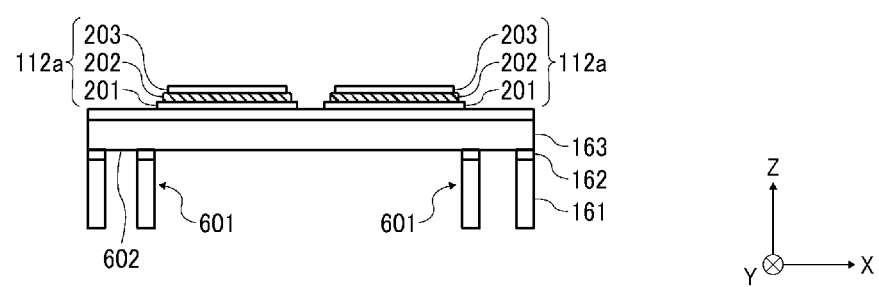

As illustrated in FIGS. 13 and 14, the SOI substrate includes a silicon substrate including a silicon supporting layer 161 as a base material layer being a first silicon layer including, for example, single crystal silicon (Si), a silicon oxide layer 162 on the silicon supporting layer 161, and a silicon active layer 163 being a second silicon layer on the silicon oxide layer 162.

Since the thickness of the silicon active layer 163 is smaller in the Z axis direction than in an X axis direction or a Y axis direction, a member including the silicon active layer 163 has a function as an elastic member having elasticity.

For example, according to the present embodiment, as illustrated in FIG. 13, the second driving units 130a and 130b and the first driving units 110a and 110b each have the silicon active layer 163 as a base material and thus have the function as the elastic member. Here, "having the elasticity" or "having the function as the elastic member" means having restoring force against deformation of a piezoelectric unit 202 to be described later.

Note that, the SOI substrate does not necessarily have a planar shape, and thus may have curvature. The member used for the formation of the light deflector 13 is not limited to the SOI substrate as long as a substrate to which integrally forming can be performed with the etching processing, the substrate being capable of partially having elasticity, is provided.

The mirror unit 101 includes, for example, a mirror base 102 having a disk shape and the reflection plane 14 on the surface of the mirror base 102 on the +Z side. The mirror base 102 includes, for example, the silicon active layer 163.

The reflection plane 14 includes, for example, a metal thin film containing aluminum, gold, or silver. The mirror unit 101 may include a rib for reinforcing the mirror unit 101, on the surface of the mirror base 102 on the −Z side.

The rib includes, for example, the silicon supporting layer 161 and the silicon oxide layer 162, and can inhibit the reflection plane 14 from being distorted by the operation of the mirror unit 101.

The first driving units 110a and 110b include two torsion bars 111a and 111b and the first piezoelectric driving units 112a and 112b, the two torsion bars 111a and 111b extending in a first axis direction to movably support the mirror unit 101, one end of each of the torsion bars 111a and 111b being coupled to the mirror base 102, the first piezoelectric driving units 112a and 112b each having one end coupled to the torsion bar and the other end coupled to an inner periphery of the first supporting unit 120, respectively.

As illustrated in FIG. 13, the torsion bars 111a and 111b each include the silicon active layer 163. The first piezoelectric driving units 112a and 112b each include sequentially a lower electrode 201, the piezoelectric unit 202, and an upper electrode 203 on the surface of the silicon active layer 163 on the +Z side. The upper electrode 203 and the lower electrode 201 each include, for example, gold (Au) or platinum (Pt). The piezoelectric unit 202 includes, for example, lead zirconate titanate (PZT) being a piezoelectric material.

The first supporting unit 120 includes a rectangular support formed to surround the mirror unit 101, the rectangular support including the silicon supporting layer 161, the silicon oxide layer 162, and the silicon active layer 163. Note that, an insulating layer 164 (e.g., a silicon oxide layer) may be provided on the silicon active layer 163 in order to avoid electrical connection with the lower electrode 201.

As illustrated in FIGS. 15A to 15E, the first supporting unit 120 includes a thin portion 602 formed by etching the silicon supporting layer 161, the thin portion 602 including the silicon active layer 163 having a thickness of 30 μm and the insulating layer 164, and a thick portion 601 having a three-layer laminated structure including the silicon active layer 163, the silicon oxide layer 162, and the silicon supporting layer 161, the thick portion 601 being a plate-shaped or columnar bone member having a total thickness of 300 μm. Here, FIGS. 15(b) to 15E are cross-sectional views taken along lines A-A', B-B', C-C', and D-D' of FIG. 15A, respectively.

The thick portion 601 is formed so as to divide the thin portion 602 as illustrated in the cross-sectional views viewed in the respective directions in FIGS. 15(b) to 15E. That is, the thick portion 601 forms the frame structure of the first supporting unit 120. Note that, here, the frame structure indicates a mode in which the thick portion 601 functions as a beam so as to reinforce the rigidity that has degraded due to so-called "hollowing out".

With the frame structure, the rigidity of the first supporting unit 120 is lower than the rigidity of a simple plate-shaped member having a thickness of 300 μm so that the first supporting unit 120 easily deforms. However, the thick portion 601 reinforces the rigidity in the degree in which breaking due to the deformation barely occurs.

According to the present embodiment, the frame structure including the thick portion 601 having the plate shape parallel to the X direction being an oscillation direction of the mirror unit 101 (namely, the main-scanning direction) and the thick portion 601 having the plate shape perpendicular to the X direction, combined, is provided.

Note that, the frame structure is not limited to the configuration, and thus may include, for example, a plurality of the thick portions 601 having the plate shape, combined to cross each other. A structure in which the thick portion 601 and the thin portion 602 retain a state where the deformation more easily occurs in comparison to a case where a simple plate-shaped member is used, while retaining the overall rigidity to some extent, is at least provided.

Figure 16:
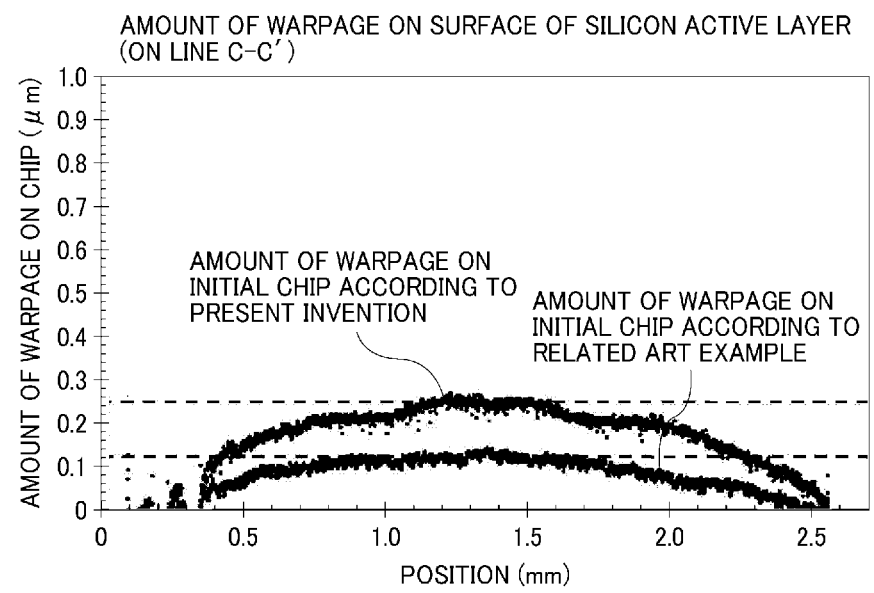
FIG. 16 is a graph illustrating a measured result of warpage in a C-C' cross-section in the configuration illustrated in FIGS. 15A to 15E.

FIG. 16 illustrates a comparison in amount of warpage between the present invention and a related art example in which formation is made with a simple plate-like SOI substrate, as will be described later with reference to FIG. 25A to FIG. 25E. As illustrated in FIG. 16, the warpage according to the related art example is 0.12 μm, whereas the warpage after forming per length of 2.5 mm is 0.24 μm larger in the first supporting unit 120 according to the present embodiment. This can be considered to be due to stress occurring in removing the silicon supporting layer 161. Note that, since the thick portion 601 and the thin portion 602 are excluded from a configuration similar to the configuration according to the first embodiment, the same reference signs are given in notation according to the related art example in FIG. 25. Thus the descriptions will be appropriately omitted.F In this manner, the first supporting unit 120 has elastic force so as to retain the state where the deformation more easily occurs in comparison to the case where the simple plate-shaped member is used.

Note that, since the amount of displacement of the mirror unit 101 is in a unit of at least several tens μm, the influence of the warpage due to the stress, on the oscillation of the mirror unit 101, can be considered to be sufficiently small.

The second driving units 130a and 130b include the plurality of second piezoelectric driving units 131a to 131f and 132a to 132f coupled so as to be folded back, respectively.

One end of each of the second driving units 130a and 130b is coupled to an outer periphery of the first supporting unit 120 and the other end is coupled to an inner periphery of the second supporting unit 140.

At this time, a coupling portion between the second driving unit 130a and the first supporting unit 120, a coupling portion between the second driving unit 130b and the first supporting unit 120, a coupling portion between the second driving unit 130a and the second supporting unit 140, and a coupling portion between the second driving unit 130b and the second supporting unit 140, may be point-symmetric with respect to the center of the reflection plane 14.

As illustrated in FIG. 14, the second piezoelectric driving units 131a and 131b each include sequentially the lower electrode 201, the piezoelectric unit 202, and the upper electrode 203 on the surface of the silicon active layer 163 on the +Z side. The upper electrode 203 and the lower electrode 201 each include, for example, gold (Au) or platinum (Pt). The piezoelectric unit 202 includes, for example, a piezoelectric member including lead zirconate titanate (PZT) being a piezoelectric material.

The second supporting unit 140 includes, for example, a rectangular support formed to surround the mirror unit 101, the first driving units 110a and 110b, the first supporting unit 120, and the second driving units 130a and 130b, the rectangular support including the silicon supporting layer 161, the silicon oxide layer 162, and the silicon active layer 163.

The electrode connector 150 is formed, for example, on the surface of the second supporting unit 140 on the +Z side, and is electrically coupled to the first piezoelectric driving units 112a and 112b, the respective upper electrodes 203 and the respective lower electrodes 201 of the second piezoelectric driving units 131a to 131f, and the driving device 11 illustrated in FIG. 1 through an electrode conductive line, such as aluminum (Al).

Note that, the upper electrode 203 or the lower electrode 201 may be directly coupled to the electrode connector 150 or may be indirectly coupled with coupling between the electrodes.

According to the present embodiment, a case where the piezoelectric unit 202 has been formed on one surface (the surface on the +Z side) of the silicon active layer 163 being the elastic member, has been exemplarily described, but the piezoelectric unit 202 may be provided on the other surface of the elastic member (e.g., the surface on the −Z side) or may be provided on both of the one surface and the other surface of the elastic member.

The shape of each of the constituent elements is not limited to the shape according to the embodiment as long as the mirror unit 101 can be driven around the first axis or the second axis. For example, the torsion bars 111a and 111b and the first piezoelectric driving units 112a and 112b each may have a shape with curvature.

Furthermore, an insulating layer including a silicon oxide film, may be formed on at least one of the surface of the upper electrode 203 of each of the first driving units 110a and 110b on the +Z side, the surface of the first supporting unit 120 on the +Z side, the surface of the upper electrode 203 of each of the second driving units 130a and 130b on the +Z side, and the surface of the second supporting unit 140 on the +Z side.

At this time, an electrode conductive line is provided on the insulating layer, and the insulating layer is partially removed or no insulating layer is formed for an opening at a coupling spot at which the upper electrode 203 or the lower electrode 201 and the electrode conductive line are coupled to each other. Thus, the degree of freedom in designing the first driving units 110a and 110b, the second driving units 130a and 130b, and the electrode conductive line, increases so that a short circuit due to a contact between the electrodes can be further inhibited. Note that, the insulating layer as least includes a member having an insulating property and additionally may have a function as an antireflective material.

<Details of Control of Driving Device>

Next, the control of the driving device 11 that drives the first driving units and the second driving units of the light deflector 13, will be described in detail.

When a positive or negative voltage is applied in the polarization direction of the piezoelectric unit 202 included in each of the first driving units 110a and 110b and the second driving units 130a and 130b, deformation (e.g., expansion and contraction) pro-portional to the potential of the voltage that has been applied, occurs so that a so-called inverse piezoelectric effect is exerted. The first driving units 110a and 110b and the second driving units 130a and 130b move the mirror unit 101 with the reverse piezoelectric effect.

At this time, the angle at which a bundle of light incident on the reflection plane 14 of the mirror unit 101 is deflected, is called a deflection angle. The deflection angle when no voltage is applied to the piezoelectric unit 202 is defined as zero. The deflection angle larger than the angle of zero, is defined as a positive deflection angle, and the deflection angle smaller than the angle of zero, is defined as a negative deflection angle.

First, the control of the driving device 11 that drives the first driving units 110a and 110b, will be described. In the first driving units 110a and 110b, when a driving voltage is applied in parallel to the piezoelectric units 202 included in the first piezoelectric driving units 112a and 112b through the upper electrodes 203 and the lower electrodes 201, each of the piezoelectric units 202 deforms. Due to the deformation of the piezoelectric units 202, the first piezoelectric driving units 112a and 112b bend and deform. As a result, driving force around the first axis acts on the mirror unit 101 through the torsion of each of the two torsion bars 111a and 111b so that the mirror unit 101 moves around the first axis. The driving voltage applied to the first driving units 110a and 110b is controlled by the driving device 11.

Therefore, the driving device 11 applies the driving voltage having a predetermined sinusoidal waveform, in parallel to the first piezoelectric driving units 112a and 112b included in the first driving units 110a and 110b so that the mirror unit 101 can move around the first axis $O_1$ in the cycle of the driving voltage having the predetermined sinusoidal waveform.

In particular, for example, in a case where the frequency of the voltage having the sinusoidal waveform has been set to approximately 20 kHz approximate to the resonance frequency of each of the torsion bars 111a and 111b, the mirror unit 101 can resonantly oscillate at a frequency of approximately 20 kHz with the occurrence of mechanical resonance due to the torsion of each of the torsion bars 111a and 111b.

For example, recent optical scanning devices in which such a light deflector is mainly used, are required to be miniaturized with a scannable distance being retained.

However, in a case where the piezoelectric units 202 expand and contract with the application of a voltage and the mirror unit 101 oscillates due to the torsion of each of the torsion bars 111a and 111b, there is a disadvantage that simply performing the miniaturization causes a decrease in the deflection angle θ.

The disadvantage will be described with a specific example.

Figure 17A:
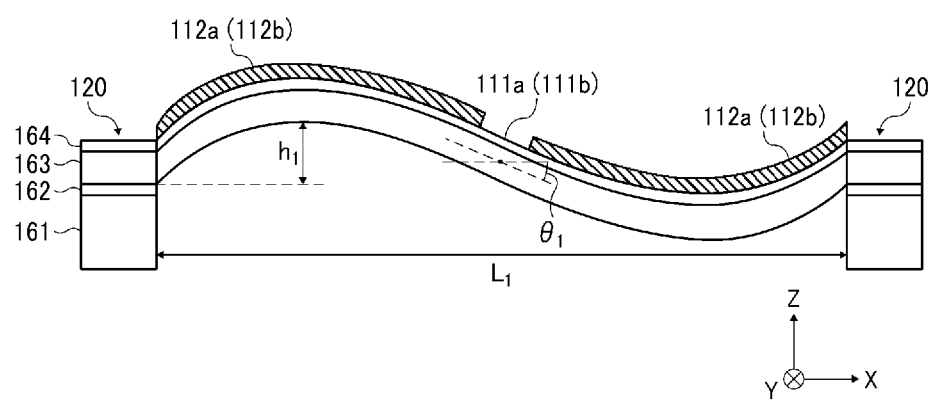
FIGS. 17A and 17B are views schematically illustrating a decrease in deflection angle caused due to the size of the light deflector.
Figure 17B:
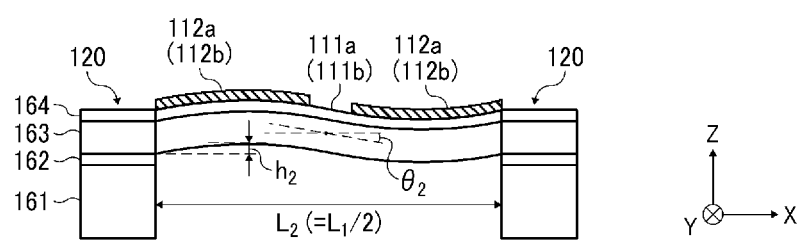

First, as illustrated in FIG. 17A, consider the light deflector including the first piezoelectric driving units 112a and 112b having a length of $L_1$ and a deflection angle of $\theta_1$, the first piezoelectric driving units 112a and 112b each being a cantilever. Next, as illustrated in FIG. 17B, consider a deflection angle of $\theta_2$ in a case where the length of each of the first piezoelectric driving units 112a and 112b is set to $L_2$ ($=\frac{1}{2} \times L_1$) with the other conditions remaining. At this time, the first piezoelectric driving units 112a and 112b each expand and contract in accordance with a voltage to be applied, the first piezoelectric driving units 112a and 112b each including one end secured to the first supporting unit 120. Thus, the displacements $h_1$ and $h_2$ of the ends in FIGS. 17A and 17B are different from each other, and the following expression is assumed to be satisfied: $h_1 ≈ 4h_2$ for a doubly supported beam structure.

Therefore, a difference of approximately four times occurs in torsion angle between the torsion bars 111a and 111b, resulting in a torsion angle of $\theta_1 > \theta_2$.

Therefore, as compared between FIGS. 17A and 17B, reducing the lengths of the first piezoelectric driving units 112a and 112b, namely, miniaturizing the first piezoelectric driving units 112a and 112b, generally decreases a scanning angle θ being the deflection angle of the mirror unit 101.

As described above, the scanning angle θ varies in accordance with the voltage applied to the piezoelectric units 202.

In other words, the voltage to be applied at least increases in order to retain the scanning angle θ with the miniaturization performed. However, increasing the applied voltage after the miniaturization is likely to cause an unintended failure, such as a short circuit.

In order to solve such a disadvantage, a technique for retaining the scanning angle with the miniaturization performed, has been required.

According to the present embodiment, there are provided the mirror unit 101 including the reflection plane 14, the mirror unit 101 configured to turn around the predetermined rotational axis $O_1$, a pair of the torsion bars 111a and 111b rotatably supporting the mirror unit 101, and the first piezoelectric driving units 112a and 112b configured to drive the mirror unit 101 to turn, through the torsion bars 111a and 111b.

The first piezoelectric driving units 112a and 112b have the one ends coupled to the torsion bars 111a and 111b and the other ends coupled to the first supporting unit 120 formed to surround the mirror unit 101.

According to the present embodiment, the first supporting unit 120 includes the thick portion 601 and the thin portion 602 at least partially different from each other in thickness.

Figure 18A:
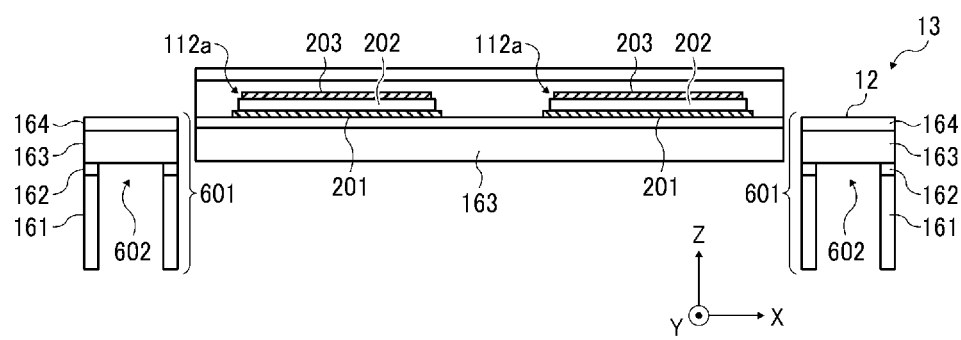
FIGS. 18A and 18B are views illustrating exemplary deformation of the light deflector in operation.
Figure 18B:
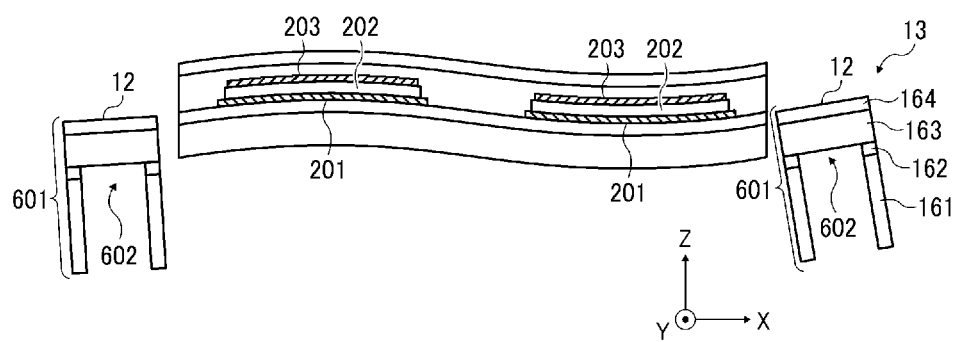
Figure 19:
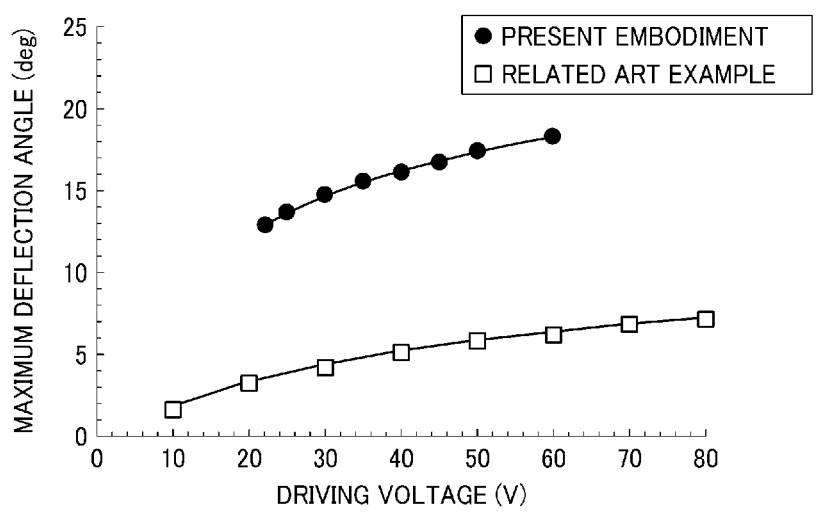
FIG. 19 is a graph illustrating a comparison in scanning angle between the light deflector according to the present invention and a light deflector according to a related art example.

With the configuration, as illustrated in FIGS. 18A and 18B, the thin portion 602 deforms so that the first supporting unit 120 easily deforms, in other words, the first supporting unit 120 deforms with elasticity improved. Thus, the scanning angle θ is retained with the voltage retained even in miniaturizing the light deflector 13. Specifically, as a result of measurement of the scanning angle θ, it is found that the scanning angle θ more improves than the scanning angle according to the related art example as illustrated in FIG. 19.

Figure 20A:
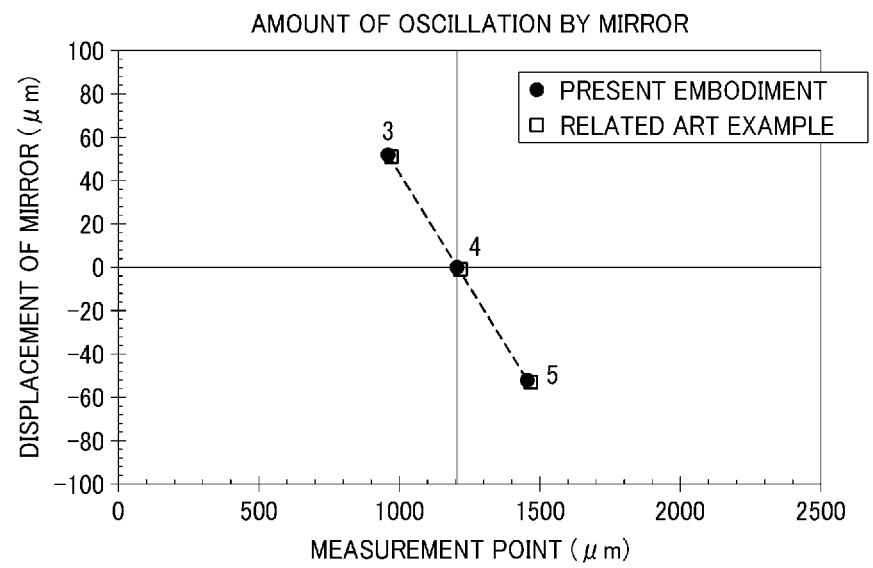
FIGS. 20A to 20C are graphs and a view illustrating the degree of displacement in a first supporting unit of the light deflector according to the present invention.
Figure 20B:
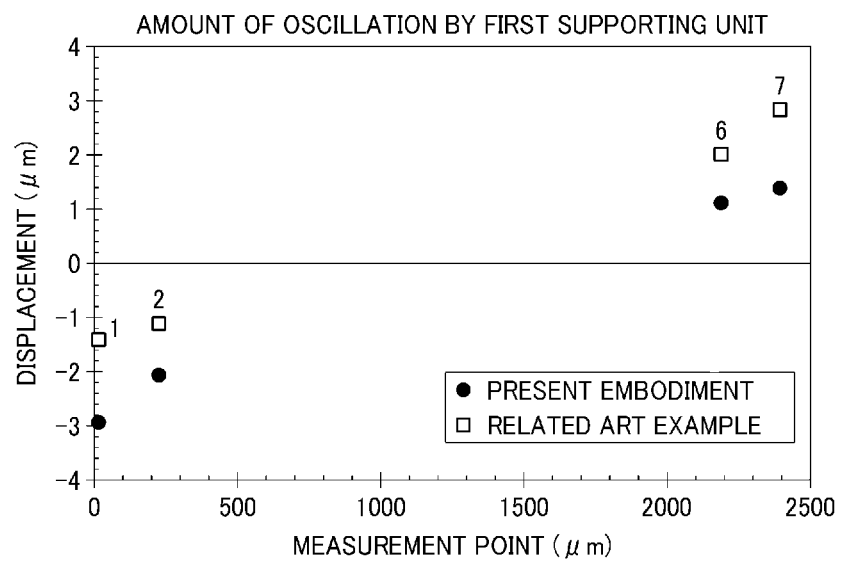

When the light deflector 13 of the above configuration is operated such that the mirror unit 101 oscillates, as illustrated in FIG. 20B, in particular, the amount of oscillation by the first supporting unit 120 is improved compared with the amount of oscillation in the related art example.

Figure 20C:
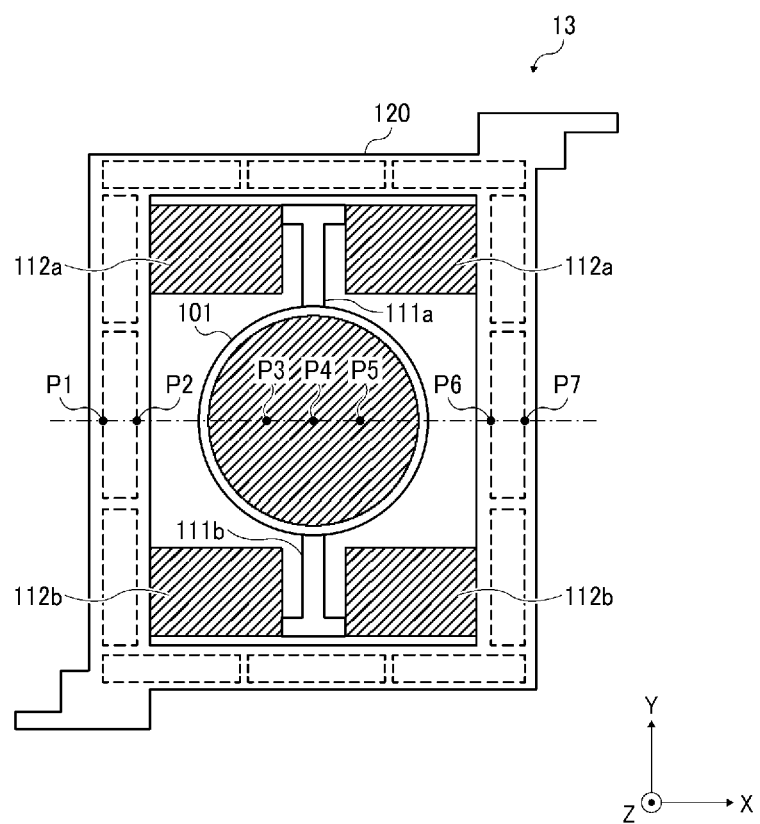

Here, for comparison with the related art example, an amount of oscillation in the mirror unit 101 is adjusted in the same manner as the related art example as illustrated in FIG. 20A so that the amount of oscillation of the first supporting unit 120 at that time is illustrated as an amount of oscillation according to the present embodiment. The numbers of points illustrated in FIGS. 20A and 20B indicate amount of oscillations at positions P1 to P7 illustrated in FIG. 20C.

Next, the control of the driving device 11 that drives the second driving units 130a and 130b, will be described.

Figure 21A:
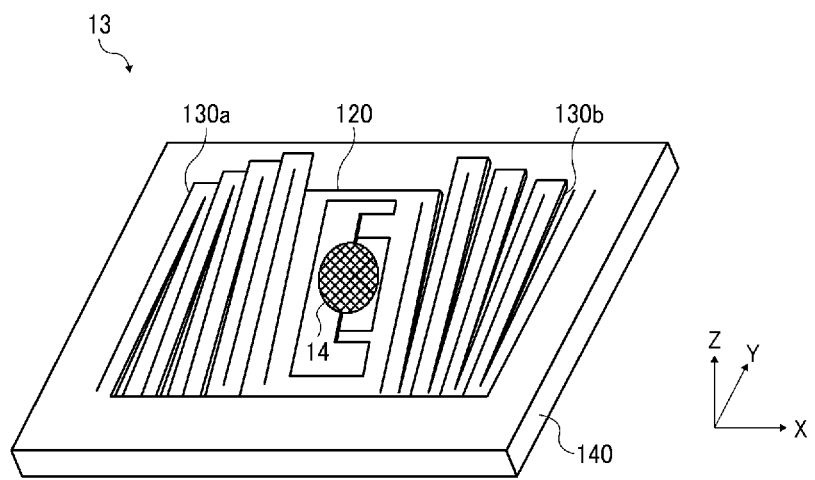
FIGS. 21A and 21B are views illustrating an exemplary operation of the light deflector.
Figure 21B:
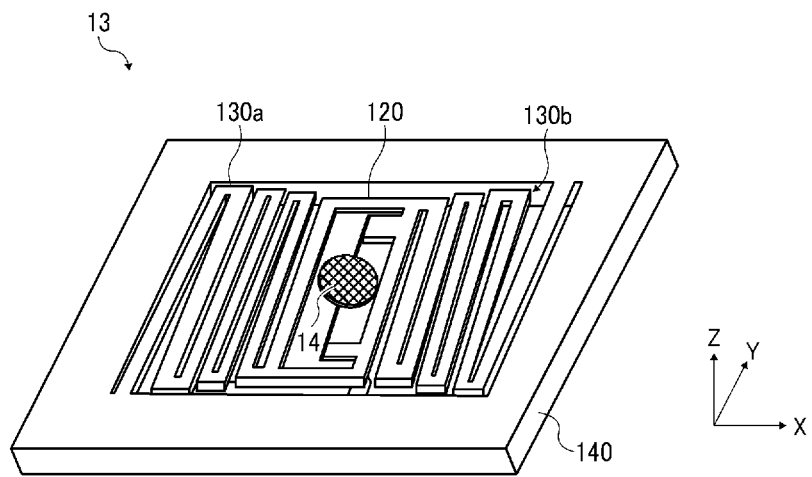

FIGS. 21A and 21B are schematic views of the driving of each of the second driving units 130a and 130b of the light deflector 13. An area indicated with hatching is the mirror unit 101.

Among the plurality of second piezoelectric driving units 131a to 131f included in the second driving unit 130a, the second piezoelectric driving unit having an even number counted from the second piezoelectric driving unit (131a) having the shortest distance from the mirror unit 101, namely, the second piezoelectric driving units 131b, 131d and 131f are defined as a piezoelectric driving unit group A. Furthermore, among the plurality of second piezoelectric driving units 132a to 132f included in the second driving unit 130b, the second piezoelectric driving unit having an odd number counted from the second piezoelectric driving unit (132a) having the shortest distance from the mirror unit 101, namely, the second piezoelectric driving units 132a, 132c, and 132e are similarly defined as the piezoelectric driving unit group A. When the driving voltage is applied in parallel to the piezoelectric driving unit group A, as illustrated in FIG. 21A, the piezoelectric driving unit group A bends and deforms in the same direction so that the mirror unit 101 moves around the second axis $O_2$ to have a positive deflection angle.

Among the plurality of second piezoelectric driving units 131a to 131f included in the second driving unit 130a, the second piezoelectric driving unit having an odd number counted from the second piezoelectric driving unit (131a) having the shortest distance from the mirror unit 101, namely, the second piezoelectric driving units 131a, 131c, and 131e are defined as a piezoelectric driving unit group B. Furthermore, among the plurality of second piezoelectric driving units 132a to 132f included in the second driving unit 130b, the second piezoelectric driving unit having an even number counted from the second piezoelectric driving unit (132a) having the shortest distance from the mirror unit 101, namely, the second piezoelectric driving units 132b, 132d and 132f are similarly defined as the piezoelectric driving unit group B. When the driving voltage is applied in parallel to the piezoelectric driving unit group B, as illustrated in FIG. 21B, the piezoelectric driving unit group B bends and deforms in the same direction so that the mirror unit 101 moves around the second axis $O_2$ to have a negative deflection angle.

As illustrated in FIGS. 21A and 21B, the second driving units 130a and 130b bend the plurality of piezoelectric units 202 included in the piezoelectric driving unit group A or the plurality of piezoelectric units 202 included in the piezoelectric driving unit group B, so as to accumulate a movable amount due to the bend and the deformation. Thus, the deflection angle of the mirror unit 101 around the second axis can increase.

For example, as illustrated in FIG. 12, the second driving units 130a and 130b are point-symmetrically coupled to the first supporting unit 120 with respect to the center point of the first supporting unit 120. Therefore, when the driving voltage is applied to the piezoelectric driving unit group A, driving force that moves the connector between the first supporting unit 120 and the second driving unit 130a in a +Z direction, occurs in the second driving unit 130a, and driving force that moves the connector between the first supporting unit 120 and the second driving unit 130b in a −Z direction, occurs in the second driving unit 130b. Thus, a movable amount is accumulated so that the deflection angle of the mirror unit 101 around the second axis can increase.

When no voltage is applied or when the movable amount of the mirror unit 101 due to the piezoelectric driving unit group A with the voltage application and the movable amount of the mirror unit 101 due to the piezoelectric driving unit group B with the voltage application, balance with each other, the deflection angle becomes zero.

As illustrated in FIG. 22, applying the driving voltage to the second piezoelectric driving units to continuously repeat the states in FIG. 21A and FIG. 21B, can drive the mirror unit 101 around the second axis $O_2$.

<Driving Voltage>

The driving voltage applied to the second drive units is controlled by the driving device. The driving voltage applied to the piezoelectric driving unit group A (hereinafter, referred to as a driving voltage A) and the driving voltage applied to the piezoelectric driving unit group B (hereinafter, referred to as a driving voltage B), will be described referring to FIGS. 22A to 22C. An application means that applies the driving voltage A (a first driving voltage) is referred to as a first application means, and an application means that applies the driving voltage B (a second driving voltage) is referred to as a second application means.

Figure 22A:
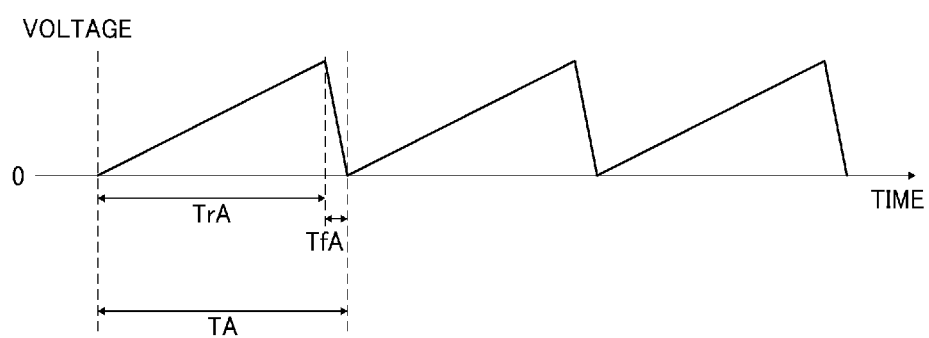
FIGS. 22A to 22C are graphs each illustrating an exemplary waveform of an applied voltage during the operation of the light deflector.
Figure 22B:
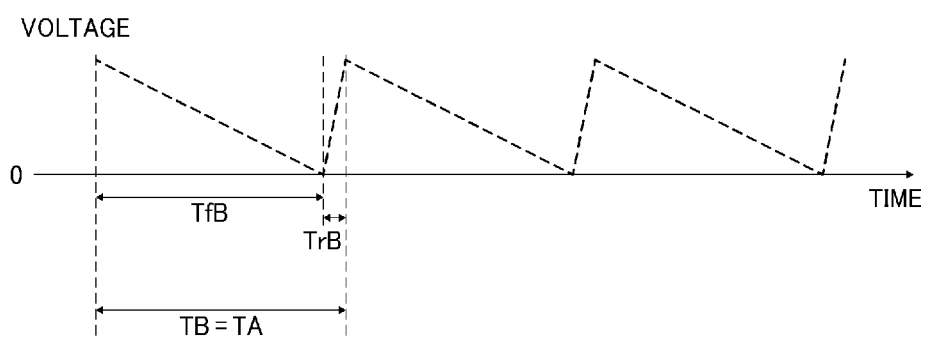
Figure 22C:
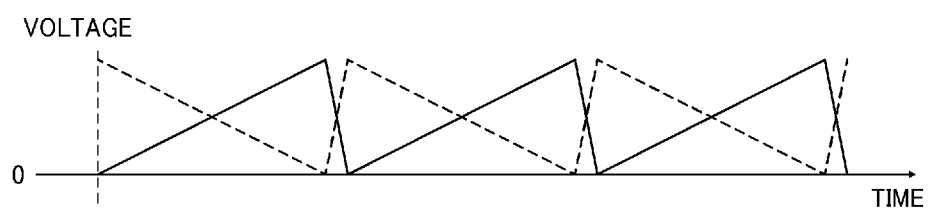
Figure 23A:
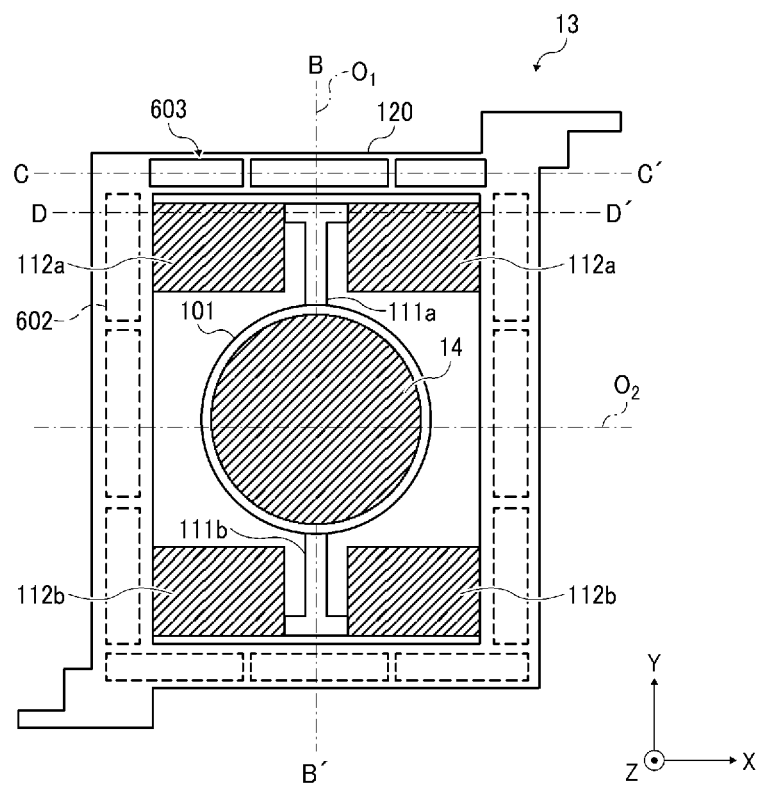
FIGS. 23A to 23D are views illustrating an exemplary configuration of a light deflector according to a first modification of the present invention.
Figure 23B:
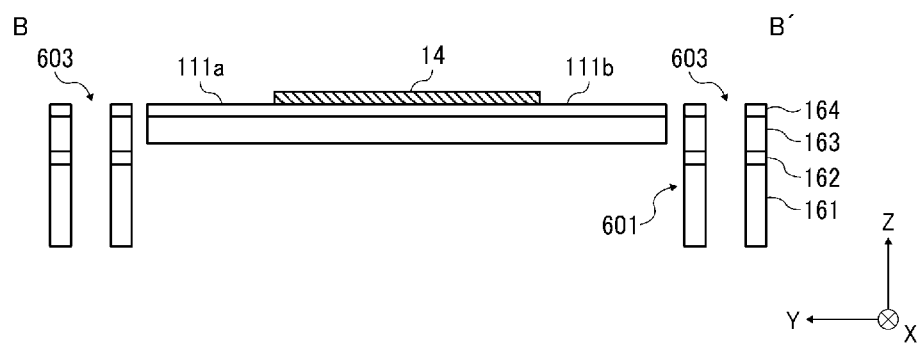
Figure 23C:
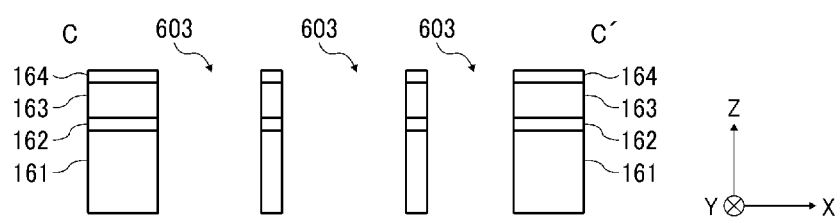
Figure 23D:
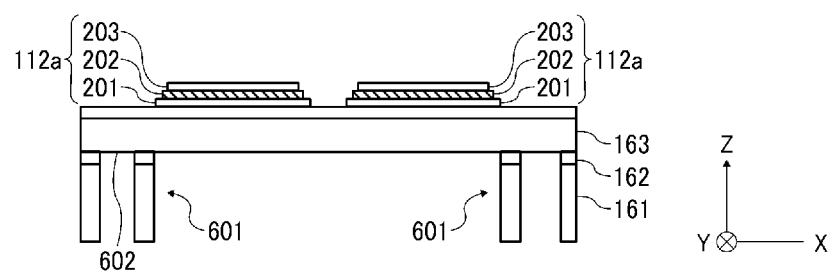

FIG. 22A illustrates an exemplary waveform of the driving voltage A applied to the piezoelectric driving unit group A of the light deflector. FIG. 22B illustrates an exemplary waveform of the driving voltage B applied to the piezoelectric driving unit group B of the light deflector. FIG. 22C is a graph illustrating the waveform of the driving voltage A and the waveform of the driving voltage B superimposed.

As illustrated in FIG. 22A, the waveform of the driving voltage A applied to the piezoelectric driving unit group A includes, for example, a sawtooth waveform with a frequency of 60 Hz. When the time width of a rising period during which a voltage value increases from the minimum value to the next maximum value, is defined as TrA and the time width of a falling period during which the voltage value decreases from the maximum value to the next minimum value, is defined as TfA, for example, the waveform of the driving voltage A is preset to a ratio satisfying the following expression: TrA:TfA=9:1. At this time, the ratio of TrA to one cycle is referred to as the symmetry of the driving voltage A.

As illustrated in FIG. 22B, the waveform of the driving voltage B applied to the piezoelectric driving unit group B includes, for example, a sawtooth waveform with a frequency of 60 Hz. When the time width of a rising period during which a voltage value increases from the minimum value to the next maximum value, is defined as TrB and the time width of a falling period during which the voltage value decreases from the maximum value to the next minimum value, is defined as TfB, for example, the waveform of the driving voltage B is preset to a ratio satisfying the following expression: TfB:TrB=9:1. At this time, the ratio of TfB to one cycle is referred to as the symmetry of the driving voltage B. As illustrated in FIG. 22C, for example, the cycle TA of the waveform of the driving voltage A and the cycle TB of the waveform of the driving voltage B are set to be the same.

Note that, the sawtooth waveforms of the driving voltage A and the driving voltage B are generated by, for example, superimposing sinusoidal waves. According to the present embodiment, driving voltages having the sawtooth waveforms have been used as the driving voltages A and B. However, the driving voltages A and B are not limited to the driving voltages, and thus the waveforms of the driving voltages A and B each can be changed in accordance with a device characteristic of the light deflector, for example, a driving voltage having a waveform including the peaks of a sawtooth waveform rounded or a driving voltage having a waveform including the linear areas of a sawtooth waveform curved. In this case, the symmetry is the ratio of rising time to one cycle or the ratio of falling time to the one cycle. At this time, which of the rising time and the falling time is used as a reference, may be arbitrarily set.

According to the present embodiment, the first supporting unit 120 has the laminated structure including the silicon supporting layer 161 being the base material layer and the silicon active layer 163 being an active layer. The thin portion 602 includes the silicon active layer 163.

With the configuration, the elasticity in the first supporting unit 120 improves so that the first supporting unit 120 more easily deforms than the support having the simple plate shape according to the related art example, resulting in the deflection angle increasing in the same condition.

Therefore, even in miniaturizing the light deflector 13, the scanning angle is retained with the voltage retained.

According to the present embodiment, the light deflector 13 includes the plurality of first driving units 110a and 110b symmetrically arranged to each other with the torsion bars 111a and 111b interposed. The first driving units 110a and 110b are arranged so as to be orthogonal to the torsion bars 111a and 111b, respectively.

With the configuration, the first driving units 110a and 110b twist the torsion bars 111a and 111b from both sides. Since the force perpendicularly acts on the torsion bars 111a and 111b, the deflection angle more easily increases.

According to the present embodiment, the first supporting unit 120 includes the thin portion 602 and the thick portion 601 provided, but the second supporting unit 140 may have a similar configuration.

Next, a first modification of the present embodiment will be described.

According to the first modification, as illustrated in FIGS. 23A to 23D, a first supporting unit 120 includes a thick portion 601, a thin portion 602, and an opening 603 including the thick portion 601 and the thin portion 602 different from each other in thickness.

Particularly, as illustrated in FIGS. 23A to 23D, the opening 603 includes a rectangular hole formed to penetrate through the first supporting unit 120, and is formed so as to be surrounded by the thick portion 601.

The opening 603 may be coupled to a side to which no first driving units 110a and 110b are coupled, in the inner periphery of the first supporting unit 120.

The reason will be described. Forming the opening 603 further greatly degrades the rigidity of the first supporting unit 120 in comparison to a case where the thin portion 602 is simply provided. If a frame portion of the first supporting unit 120 and torsion bars 111a and 111b simultaneously move due to the degradation of the rigidity, there is a risk that a torsion angle rather decreases.

That is, the first supporting unit 120 is required to secure minimum rigidity in order to retain one end of each of the first driving units 110a and 110b.

According to the present modification, first piezoelectric driving units 112a and 112b are formed so as to be orthogonal to a first rotational axis $O_1$, in other words, so as to be orthogonal to the torsion bars 111a and 111b.

Ends of the first piezoelectric driving units 112a and 112b on the side of the first supporting unit 120, may be secured when the first piezoelectric driving units 112a and 112b expand and contract. The rigidity may be relatively high and thus the opening 603 may be provided to two sides to which no first piezoelectric driving units 112a and 112b have been coupled, among the four sides of the first supporting unit 120 having a rectangular shape.

With the configuration, the movable range of the mirror unit 101 easily expands so that a scanning angle is retained with a voltage retained even in miniaturizing a light deflector 13.

Figure 24A:
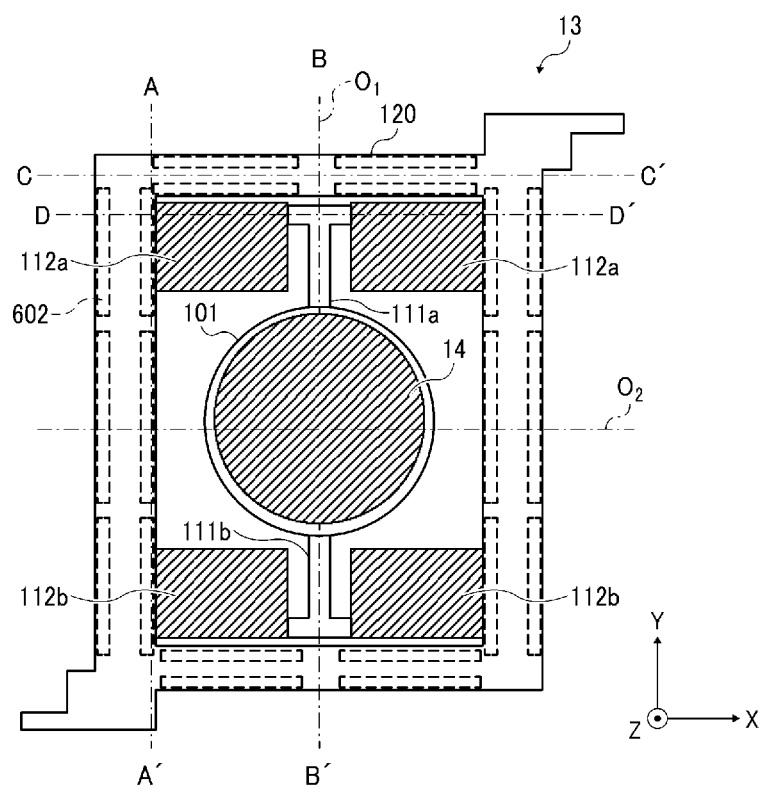
FIGS. 24A to 24E are views illustrating an exemplary configuration of a light deflector according to a second modification of the present invention.
Figure 24B:
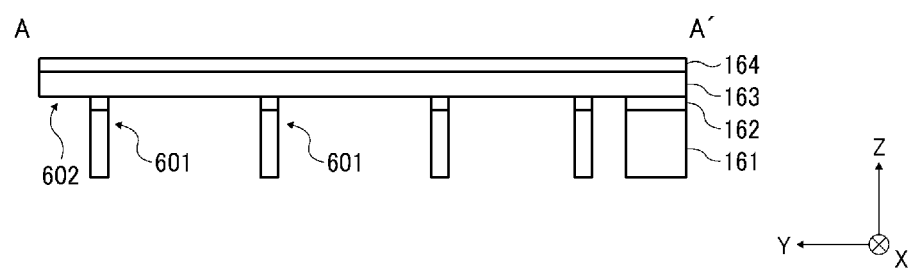
Figure 24C:
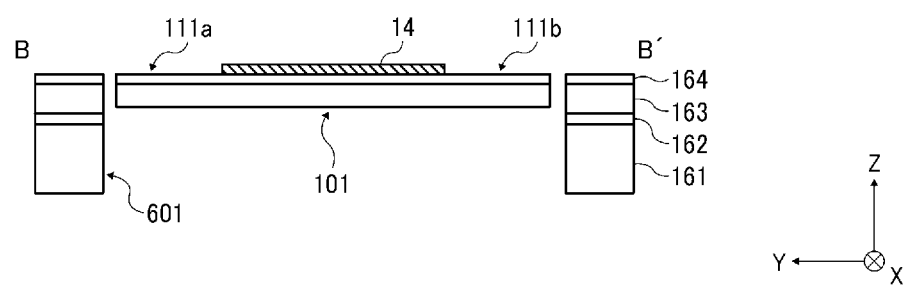
Figure 24D:
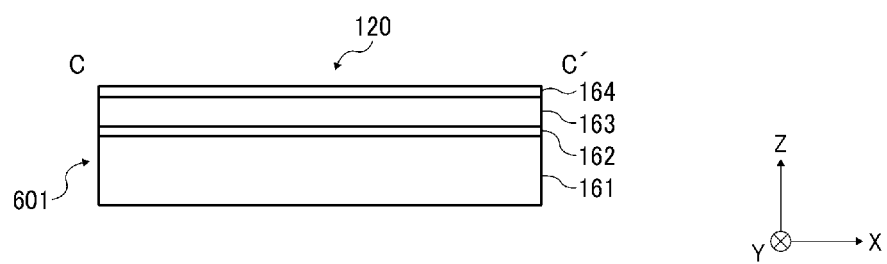
Figure 24E:
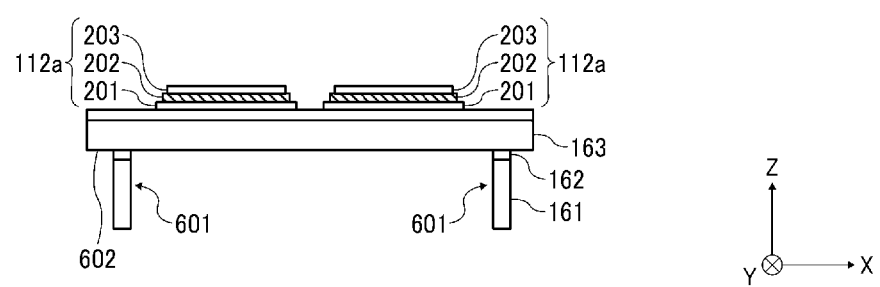
Figure 25A:
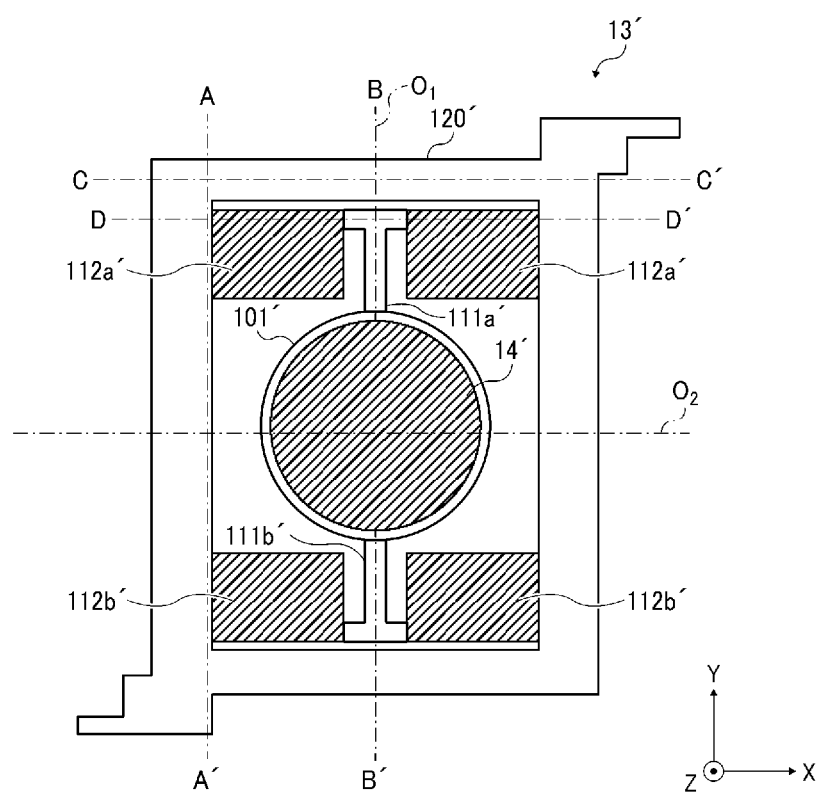
FIGS. 25A to 25E are views illustrating an exemplary configuration of the light deflector according to the related art example of the present invention.
Figure 25B:
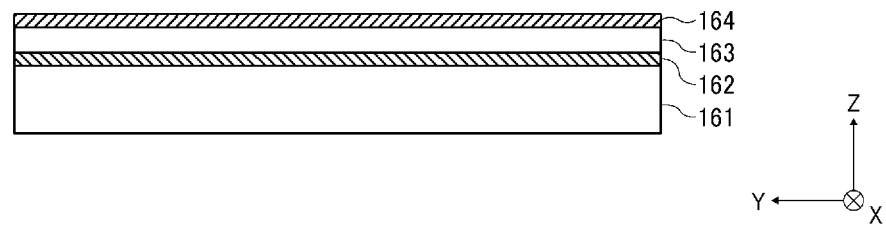
Figure 25C:
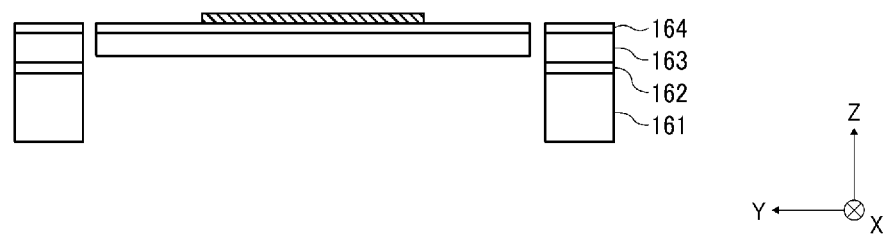
Figure 25D:
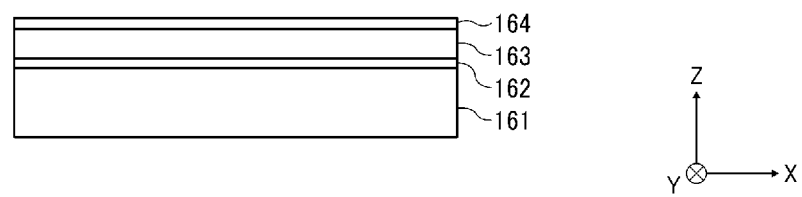
Figure 25E:
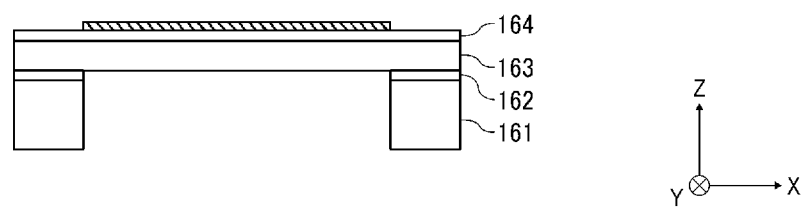

A light deflector 13 according to a second modification of the present invention will be described, the light deflector 13 including a thin portion 602 provided to a portion to which first piezoelectric driving units 112a and 112b and a first supporting unit 120 are coupled, in a frame of a first supporting unit 120 as illustrated in FIGS. 24D to 24E.

With the configuration, the rigidity of the entire first supporting unit 120 decreases, whereas the width of displacement caused when the first piezoelectric driving units 112a and 112b operate, increases since the thin portion 602 is provided to the contact portion with the first piezoelectric driving units 112a and 112b.

With the configuration, the movable range of a mirror unit 101 easily expands so that a scanning angle is retained with a voltage retained even in miniaturizing the light deflector 13.

The embodiment of the present invention and the modifications have been described above. The embodiment and the modifications are exemplary applications according to the present invention. The present invention is not limited to the embodiment and the modifications described above, and thus reduction to practice may be made with various modifications and alterations without departing from the scope of the spirit of the present invention, at the implementation stage.

For example, according to the embodiment and the modifications, the driving device 11 applies the piezoelectric units with the driving voltage having the waveform constantly having a positive voltage value, but the present invention is not limited to this as long as a configuration in which the piezoelectric units deform when the driving voltage is applied to the piezoelectric units, is provided. For example, the driving device 11 may apply the driving voltage having a waveform constantly having a negative voltage value or may apply a positive voltage value and a negative voltage value alternately, to the piezoelectric units.

According to the embodiment and the modifications, as illustrated in FIG. 12, the light deflector 13 includes a dual-typed light deflector including the first piezoelectric driving units 112a and 112b extending in the ±X directions from the torsion bars 111a and 111b, respectively, but is not limited to this as long as a configuration in which the reflection plane 14 is moved by the piezoelectric units to which a voltage has been applied, is provided.

For example, a configuration in which a single-typed light deflector including the first piezoelectric driving units 112a and 112b extending in the +X direction is used, may be provided.

According to the embodiment and the modifications, the optical deflection device 300 with the single light source 12 has been described, but an optical deflection device that uses a plurality of light sources to perform scanning with a plurality of colors, may be provided.

REFERENCE SINGS LIST

10 Optical scanning system
11 Driving device
12 Light source
13 Light deflector
14 Reflection plane
15 To-be-scanned surface
30 Control unit (an example of controller)
31 Driving signal output unit (an example of application unit)
101 Movable part (mirror unit)
102 Mirror base
110a, 110b Driving units (first driving units a and b)
111a, 111b Supporting beams (torsion bars)
112a, 112b First piezoelectric driving units
120 Supporting unit (first supporting unit)
130a, 130b Driving units (second driving units)
131a to 131f, Second piezoelectric driving units
132a to 132f, Second piezoelectric driving units
140 Second supporting unit
150 Electrode connector
161 Base material layer (silicon supporting layer)
162 Silicon oxide layer
163 Active layer (silicon active layer)
201 Lower electrode
202 Piezoelectric unit
203 Upper electrode
400 Mobile object (motor vehicle)
500 Head-up display device (image projection device)
600 Optical writing device
601 Thick portion
602 Thin portion
603 Opening
650 Laser printer (image forming apparatus)
700 LiDAR device (object recognition device)
701 Mobile object (motor vehicle)

The invention claimed is:

1. A light deflector, comprising:
a mirror unit including a reflection plane, the mirror unit configured to rotate around a predetermined rotational axis;
a pair of supporting beams configured to support the mirror unit in a rotatable manner; and
at least one first driving circuit configured to drive the mirror unit to rotate, through the supporting beams,
wherein the at least one first driving circuit has one end coupled to the supporting beams and another end coupled to a first supporting unit, which is formed to surround the mirror unit and directly support the mirror unit,
in an outer peripheral portion of the first supporting unit extending in a direction parallel to the predetermined rotational axis, the first supporting unit includes at least three separate and distinct thick portions separated by thin portions, each thick portion being thicker than each thin portion, and
the at least one first driving circuit is coupled to the thin portions of the first supporting unit through the thick portions of the first supporting unit.

2. The light deflector according to claim 1, wherein the first supporting unit has a laminated structure including a base material layer and an active layer, and each thin portion includes the active layer.

3. The light deflector according to claim 1, wherein each thin portion includes an opening.

4. The light deflector according to claim 1, wherein the at least one first driving circuit comprises a plurality of first driving circuits symmetrically arranged with respect to each other across the supporting beams, wherein the plurality of first driving circuits are arranged to he orthogonal to the supporting beams.

5. The light deflector according to claim 1, wherein the thin portion is formed at a portion at which the at least one first driving circuit and the first supporting unit are coupled to each other.

6. The light deflector of claim 1, further comprising:
at least one second driving circuit; and
a second support unit surrounding and supporting the at least one second driving circuit.

7. The light deflector of claim 1, further comprising a second supporting unit surrounding and supporting the first supporting unit.

8. The light deflector of claim 1, wherein the at least one first driving circuit is configured to drive the mirror to rotate about the predetermined rotation axis and the first supporting unit and the mirror unit are configured to rotate together, as a movable unit, around an axis orthogonal to the predetermined rotational axis.

9. An optical scanning device, comprising:
a light source; and
a light deflector configured to deflect and scan light emitted from the light source, wherein the light deflector includes the light deflector according to claim 1.

10. An image projection device, comprising:
the optical scanning device according to claim 9,
wherein an image is displayed on a projection plane by scanning the light deflected by the optical scanning device.

11. A mobile object, comprising:
the image projection device according to claim 10.

\* \* \* \* \*